(12) United States Patent     (10) Patent No.: US 12,591,136 B2

Smeeton et al.     (45) Date of Patent:    Mar. 31, 2026

(54) HOLOGRAM CALCULATION

(71) Applicant: Envisics Ltd, Milton Keynes (GB)

(72) Inventors: Timothy Smeeton, Milton Keynes (GB); Daniel Burnham, Milton Keynes (GB); Jamieson Christmas, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 719 days.

(21) Appl. No.: 17/867,513

(22) Filed: Jul. 18, 2022

(65) Prior Publication Data

US 2023/0064690 A1    Mar. 2, 2023

(30) Foreign Application Priority Data

Aug. 26, 2021   (GB) ..................................... 2112213

(51) Int. Cl.
   *G02B 27/01*      (2006.01)
   *G02B 27/00*      (2006.01)
   *G03H 1/08*      (2006.01)
   *G03H 1/22*      (2006.01)

(52) U.S. Cl.
   CPC ..... *G02B 27/0103* (2013.01); *G02B 27/0081* (2013.01); *G02B 27/0093* (2013.01); *G03H 1/2294* (2013.01); *G02B 2027/0123* (2013.01); *G03H 1/0808* (2013.01); *G03H 1/2205* (2013.01); *G03H 2226/05* (2013.01)

(58) Field of Classification Search
None
See application file for complete search history.

(56) References Cited

U.S. PATENT DOCUMENTS

2013/0222384 A1    8/2013   Futterer
2021/0255459 A1*   8/2021   Christmas .............. G02B 6/002

FOREIGN PATENT DOCUMENTS

GB      2 589 583 A    6/2021
JP     2014-503836 A    2/2014
JP     2016-519790 A    7/2016
KR   10-2017-0073458 A    6/2017
WO   WO 2014/167290 A1   10/2014
WO   WO 2021/110746 A1    6/2021

OTHER PUBLICATIONS

Combined Search and Examination Report issued in GB 2 112 213.0 on Apr. 8, 2022 (9 pages).

(Continued)

*Primary Examiner* — Dung T Nguyen
(74) *Attorney, Agent, or Firm* — Akerman LLP

(57) ABSTRACT

Systems and methods of determining a hologram of an image for a system comprising a display device and viewing system are disclosed. Some embodiments implement a multi-stage procedure comprising (i) determining a first complex light field at an entrance pupil of the viewing system, (ii) determining a second complex light field at a sensor plane of a sensor of the viewing system, (iii) determining a third complex light field at the entrance pupil, and (iv) determining a fourth complex light field at the display plane. Some embodiments include extracting a hologram from a data set corresponding to the fourth complex light field.

20 Claims, 14 Drawing Sheets

(56) References Cited

OTHER PUBLICATIONS

Notice of Reasons for Refusal dated Dec. 27, 2023 in Japanese Patent Application 2022-116909 (4 pages).

Notice of Opinion Submission dated Mar. 30, 2024 issued in KR 10-2022-0093920 (6 pages).

English translation of Notice of Opinion Submission dated Mar. 30, 2024 issued in KR 10-2022-0093920 (6 pages).

Notice of Reasons for Refusal dated Jul. 18, 2023 in Japanese Patent Application 2022-116909 (4 pages).

* cited by examiner

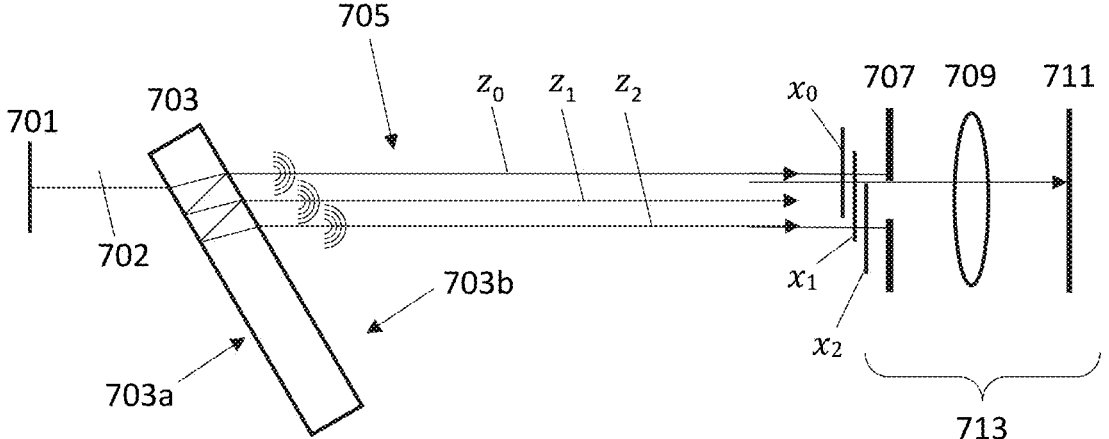
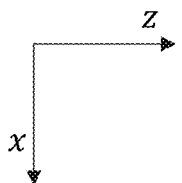
FIGURE 7

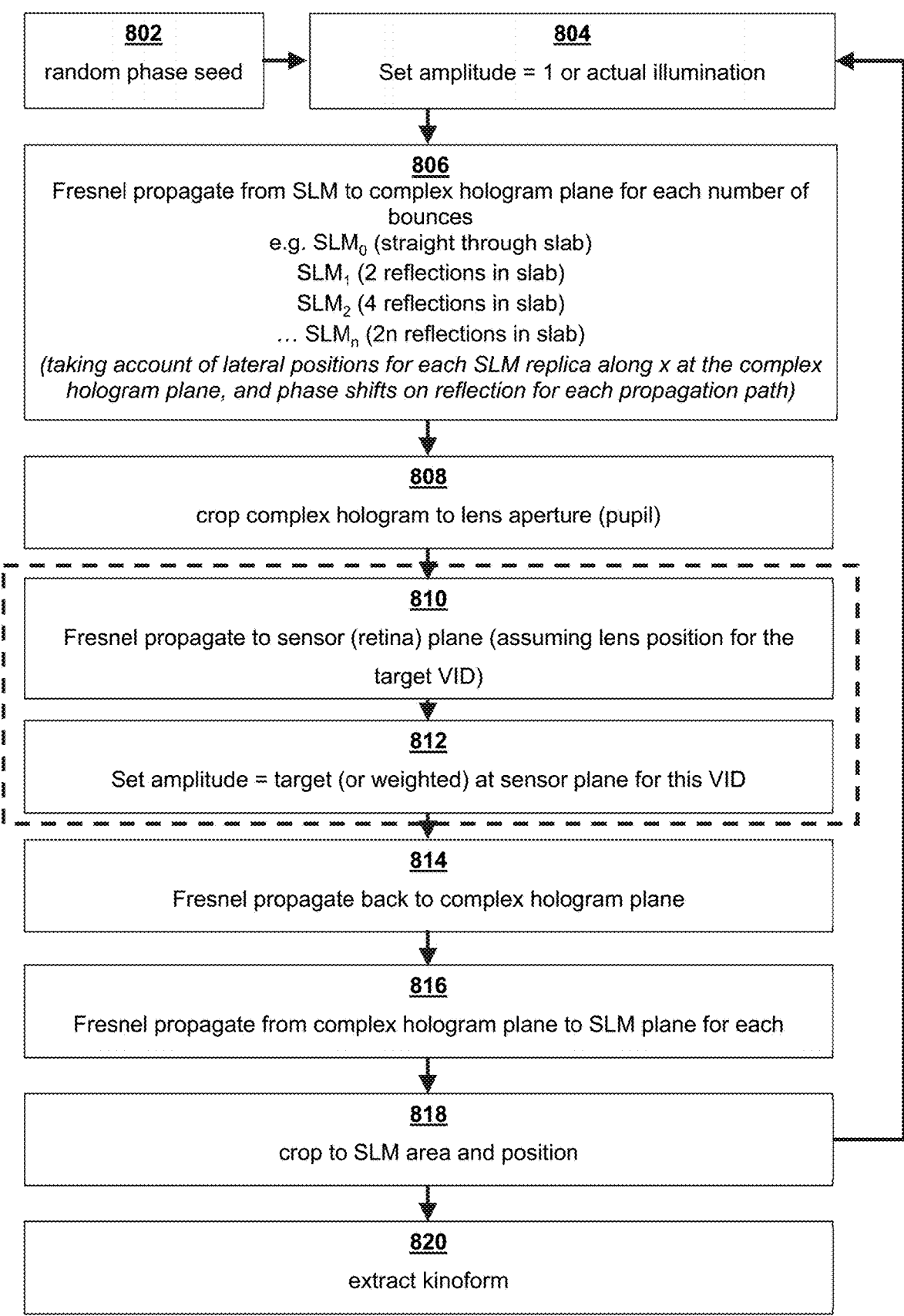

802
random phase seed

804
Set amplitude = 1 or actual illumination

806
Fresnel propagate from SLM to complex hologram plane for each number of bounces
e.g. $SLM_0$ (straight through slab)
$SLM_1$ (2 reflections in slab)
$SLM_2$ (4 reflections in slab)
... $SLM_n$ (2n reflections in slab)
*(taking account of lateral positions for each SLM replica along x at the complex hologram plane, and phase shifts on reflection for each propagation path)*

808
crop complex hologram to lens aperture (pupil)

810
Fresnel propagate to sensor (retina) plane (assuming lens position for the target VID)

812
Set amplitude = target (or weighted) at sensor plane for this VID

814
Fresnel propagate back to complex hologram plane

816
Fresnel propagate from complex hologram plane to SLM plane for each

818
crop to SLM area and position

820
extract kinoform

FIGURE 8

HOLOGRAM CALCULATION

CROSS-REFERENCE TO RELATED APPLICATIONS

This application claims priority under 35 U.S.C. § 119 to Patent Application GB 2112213.0, titled "Hologram Calculation," filed on Aug. 26, 2021. The entire contents of GB 2112213.0 are incorporated by reference herein for all purposes.

FIELD

The present disclosure relates to image projection. More specifically, the present disclosure relates to a diffractive structure, such as a hologram or kinoform, and method of determining, such as calculating or retrieving, the same. Some embodiments relate to real-time hologram calculation based on eye-tracking information. Some embodiments relate to virtual image projection. Some embodiments relate to projection of a real image. Embodiments relate to viewing a projected image through a waveguide. Some embodiments relate to a light engine such as a picture generating unit. Some embodiments relate to a head-up display.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e., is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LiDAR", for example.

SUMMARY

The present disclosure and drawings generally show one-dimensional cases for ease of explanation and illustration. However, the person skilled in the art of optics will appreciate that the concepts described and shown may extend in two-dimensions to provide two-dimensional images from two-dimensional holograms. For example, whilst only one-dimensional pupil expansion may be described and shown, the reader should appreciate that the present disclosure extends to two-dimensional pupil expansion—e.g. using two one-dimensional pupil expanders in series.

Broadly, the present disclosure relates to image projection. It relates to a method of image projection and an image projector which comprises a display device. The present disclosure also relates to a projection system comprising the image projector and a viewing system.

The present disclosure is equally applicable to a monocular and binocular viewing system. The viewing system may comprise a viewer's eye or eyes. The viewing system comprises an optical element having optical power (e.g. lens/es of the human eye) and a viewing plane (e.g. retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. The image is formed by illuminating a diffractive pattern (e.g. hologram) displayed on the display device. The present disclosure further relates to providing (e.g., calculating or determining) a diffractive pattern for image projection, and to the diffractive pattern.

The display device comprises pixels. The pixels of the display device diffract light. In accordance with well-understood optics, the magnitude of the maximum diffraction angle is determined by the size of the pixels (and other factors such as the wavelength of the light).

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In embodiments, the image is a real image. In other embodiments, the image is a virtual image that is perceived by a human eye (or eyes). The projection system, or light engine, may thus be configured so that the viewer looks directly at the display device. In such embodiments, light encoded with the hologram is propagated directly to the eye(s). This light may be referred to as being "spatially modulated" or "holographic light". In such embodiments, there is no intermediate holographic reconstruction formed, either in free space or on a screen or other light receiving surface, between the display device and the viewer. In such embodiments, the pupil of the eye may be regarded as being the entrance aperture of the viewing system and the retina of the eye may be regarded as the viewing plane of the viewing system. It is sometimes said that, in this configuration, the lens of the eye performs a hologram-to-image conversion or transform.

In accordance with the principles of well-understood optics, the range of angles of light propagating from a display device or viewing window that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g. any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g. 1 metre. And the user will be viewing the display device-sized window via the pupil(s) of their eye(s), which can also be very small. Accordingly, the field of view becomes small and the specific angular range that can be seen depends heavily on the eye position, at any given time.

It is often desirable for an optical system to be physically small—for example, when it is implemented in a location in which space is limited and/or real-estate value is high. However, physical constraints typically are associated with functional limitations. For example, in conventional optical systems, using a small display device is typically associated with having a limited field of view (FOV), thus restricting the visibility of images. A pupil expander addresses the problem of how to increase the field of view—i.e., how to increase the range of angles of light rays that are propagated from the display device, and which can successfully propagate through an eye's pupil to form an image. The display device is (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). The present disclosure relates to so-called direct view holography in which a hologram of an image is propagated to the human eye rather than the image itself. In other words, the light received by the viewer is "holographic light" that has been spatially modulated according to a hologram of the image.

In embodiments, the pupil expander is a waveguide pupil expander. The present disclosure generally (but not exclusively) relates to non-infinite virtual image distances—that is, near-field virtual images.

The pupil expander increases the field of view and therefore increase the maximum propagation distance over which the full diffractive angle of the display device may be used. Use of a pupil expander can also increase the user's eye-box laterally, thus enabling some movement of the eye/s to occur, whilst still enabling the user to see the image. In embodiments, the pupil expander is a waveguide pupil expander. The present disclosure generally relates to non-infinite virtual image distances—that is, near-field virtual images.

Aspects of the present disclosure are defined in the appended independent claims.

There is disclosed herein a method of determining a diffractive structure of an image for a system comprising a display device and viewing system. The image for which a diffractive structure is determined may be referred to as a "target" or "target image". The diffractive structure may be a hologram and the term "hologram" is used henceforth merely as an example of a diffractive structure in accordance with this disclosure. The diffractive structure may be a phase hologram, phase-only hologram or kinoform. The display device is arranged to display the hologram. The viewing system is arranged to view the hologram through a pupil expander. The viewing system comprises at least one entrance pupil, and a sensor, and may have a lens between the entrance pupil and the sensor. The pupil expander provides a plurality of light propagation paths from the display device to the viewing system.

The method comprises first to fifth stages. The first stage comprises determining a first complex light field at an entrance pupil of the viewing system. The first complex light field results from the propagation of light from a display plane (which mean instead be referred to as a "hologram plane", as it is a plane at which a hologram may be displayed) of the display device along at least one light propagation path of the pupil expander. The at least one light propagation path may comprise a single ("first") light propagation path, or multiple light propagation paths, of the plurality of light propagation paths that light may follow through the pupil expander. The first stage also comprises cropping the complex light field in accordance with the entrance pupil of the viewing system. For example, it may be cropped in accordance with at least one of the size, the shape or the position of the entrance pupil. The second stage comprises determining a second complex light field at a sensor plane of a sensor of the viewing system. The second complex light field results from the propagation of light of the first complex light field from the entrance pupil, through a lens of the viewing system, to the sensor. The second stage also comprises modifying the amplitude component of the complex light field in accordance with the image, wherein the second complex light filed is a result of said modification. The third stage comprises determining a third complex light field at the entrance pupil. The third complex light field results from the reverse propagation of light of the second complex light field from the sensor plane back through the lens. The third stage also comprises cropping the complex light field in accordance with at least one of the size, the shape, or the position of the entrance pupil. The fourth stage comprises determining a fourth complex light field at the display plane (i.e., at the hologram plane). The fourth complex light field results from the propagation of light of the third complex light field back along the at least one light propagation of the pupil expander. The fourth stage also comprises cropping the complex light field in accordance with the display device. The hologram is extracted from a data set that corresponds to/represents the fourth complex light field. That data set may be referred to as being "the fourth data set". The first to fourth steps may be iteratively repeated. The hologram converges, and likely improves, with each iteration but does plateau. The method may stop when the hologram extractable from the fourth stage is deemed of acceptable quality or the rate of change with each iteration is below a threshold value or an allotted time has expired, for example. For the avoidance of doubt, the hologram that is extracted is the hologram for display on the display device.

In embodiments in which the "at least one light propagation path" comprises a single ("first") light propagation path of the plurality of light propagation paths that light may follow through the pupil expander, the first to fourth stages may be repeated for a second, different light propagation path of the plurality of light propagation paths. A path-specific hologram may be extracted for each light propagation path, and a plurality of holograms corresponding to the plurality of respective light propagation paths may be combined in order to form a hologram for display on the display device.

The hologram may be configured to output a plurality of channels of holographic light, wherein each channel corresponds to a different respective section of an image that is to be seen/perceived by the viewing system. The pupil expander may be configured, relative to the display device and to the entrance pupil of the viewing system, such that each different respective channel of holographic light that the entrance pupil receives is output from a different respective transmission point on an output surface (or "output port") of the pupil expander. Therefore, each channel that is received by the viewing system will have undergone a different respective number of bounces within the pupil expander, and will have a different respective optical propagation path. The method may comprise carrying out the first to fourth steps detailed above, and outputting a respective channel-specific hologram, for each of the channels separately. The method may further comprise combining those individual channel-specific holograms into a combined/final hologram, which will comprise a hologram of the entire image (i.e., of the entire field of view) that is to be seen/perceived by the viewing system.

More broadly, there is disclosed herein a method of calculating a hologram of an image, the method comprising at least one step including cropping in accordance with the entrance pupil of the viewing system to form a hologram that, when illuminated, forms spatially modulated light, wherein continuous light channels of the spatially modulated light correspond with continuous regions of the image. A continuous light channel may be defined by a continuous range of light ray angles of the spatially modulated light. All continuous light channels of the spatially modulated light correspond with a continuous region of the image, such that the channels combine to provide holographic light of the entire image. A pupil expander may be provided between the display device and a viewing system, the pupil expander being arranged to direct each channel to an entrance aperture of the viewing system. Each channel may be regarded as having a unique respective central axis, which defines a primary (or, "core") direction of travel of that channel, relative to the display device, for example, relative to a central point or to another reference point on a light emitting face of the display device. The spatially modulated light may be divided into any number of continuous light channels. In some embodiments, the light channels are non-overlapping. In other embodiments—for example, those additionally including an optical combiner having optical power (e.g. vehicle windscreen) between the waveguide and viewer—some light channels may at least partially overlap. The method disclosed herein determines a diffractive structure arranged to spatially modulate light transformable by a viewing system into an image, wherein the diffractive structure is configured to route light into a plurality of hologram channels, each hologram channel corresponding to a different part of the image.

The cross-sectional area of one or more of the channels may have a size and/or shape that corresponds with the size and/or shape of the entrance aperture of the viewing system. For example, if the entrance aperture is a human eye, the channels may be substantially elliptical or oval-shaped in cross-section. In embodiments that include hologram calculations, the calculation process may include limiting or cropping the hologram in accordance with the size and/or shape of the entrance aperture and/or in accordance with the size and/or shape of the display device.

For the avoidance of doubt, the image formed or perceived by the viewer is a holographic reconstruction of a target image. The holographic reconstruction is formed from a hologram based on the target image. In some embodiments, the hologram is determined (e.g. calculated) from the target image.

The term "reverse propagation" is merely used to reflect that the propagation direction of light in the third and fourth stages is different or substantially opposite to that in the first and second stages. In this respect, the light propagation in the first and second stages may be termed "forward propagation". In some embodiments, the "forward propagation" and "reverse propagation" are a mathematical inverse of each other.

The term "cropping" is used herein to refer to a process of selectively discarding information, such as light field information, outside an area or region of interest, such as outside a light aperture. In some embodiments, "cropping" is a data processing step comprises discarding data points, or zeroing data points or simply ignoring data points, outside the aperture.

Reference is made herein to a "complex light field". The term "light field" merely indicates a pattern of light having a finite size in at least two orthogonal spatial directions, x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field. In accordance with the method disclosed herein, the complex light field is propagated forward and back in the $+z$ and $-z$ directions between a hologram plane and an image plane. Light propagation can be simulated or modelled using any one of a number of different approaches or mathematical transforms familiar to the person skilled in the art of wave optics.

The inventors have devised a method of determining a hologram for a relatively small display device and for projection over a relatively long distance, wherein the hologram is projected directly to the viewing system/s and the method is capable of implementation in real-time. The relatively small size of the display device and relatively long projection distance necessitate a pupil expander. The method devised by the inventors also addresses the optical complications introduced by using a pupil expander. The method yet further allows image content to appear at different distances from the viewing system/s and/or plural distances, optionally, at the same time—e.g. using one hologram. Yet further still, the method allows image content to appear downstream of the display device and upstream of the display device, optionally, at the same time—e.g. using one hologram.

Importantly, the hologram is propagated to the viewing system/s—not a holographic reconstruction (i.e. image) formed from the hologram. It may be said that the spatially modulated light received by the viewing system/s is in the hologram domain rather than the spatial or image domain. It may also be said that the viewing system/s performs the hologram to image transform. More specifically, an optical element such as lens of each viewing system performs the transformation. In embodiments, a holographic reconstruction or image is not formed between the display device and viewing system/s. In some embodiments, a different hologram is calculated and propagated to each eye of a viewer, optionally, using an interlacing scheme.

The display device has an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

The methods disclosed herein form a hologram configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image reconstructable from the hologram has a finite size and can be arbitrarily divided into a plurality of image sub-areas, wherein each hologram channel would correspond to each image sub-area. Importantly, the hologram of this disclosure is characterised by how it distributes the image content when illuminated. Specifically, the hologram divides the image content by angle. That is, for a unique angle, or unique continuous range of angles, of light propagation (which may be modelled light propagation, or virtual light propagation) between a continuous part, or section, of the image, and the display device (or, viewing window), a corresponding continuous hologram channel of spatially modulated light is output when the hologram on the display device is illuminated. For the avoidance of doubt, this hologram behaviour is not conventional. The spatially modulated light formed by this special type of hologram, when illuminated, may be arbitrarily divided into a plurality of hologram channels. It will be understood from the foregoing that any hologram channel that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some embodiments, a plurality of spatially separated hologram channels is formed by intentionally leaving areas of the target image, from which the hologram is calculated, blank or empty (i.e. no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram, and the appended claims are set out accordingly.

The diffractive structure or hologram may be displayed on at display device such as a spatial light modulator, such as but not limited to a liquid crystal on silicon (LCOS) spatial light modulator (SLM). When the display device displaying the diffractive structure is suitably illuminated, the diffractive structure is configured to spatially modulate the light, as a result of which the light that is emitted by the display device is routed into the plurality of hologram channels. A single (I.e., a common) light source may be used to illuminate the entire diffractive structure. The diffractive structure may comprise a plurality of pixels wherein every pixel of the diffractive structure contributes light to each of the hologram channels.

The hologram channels may instead be referred to as "holographic channels" since they comprise channels of light that has been spatially modulated by the diffractive structure.

The diffractive structure may be arranged such that the hologram channels propagate from the diffractive structure at different angles. Each such angle may be defined between a primary, or core, direction of travel of the respective channel and a point on the display device, such as a central point on the display device, on which the diffractive structure is displayed. Each pixel of the hologram or diffractive structure may output light of every channel. An individual pixel of the hologram may output light of each channel at a different respective angle.

The diffractive structure may be a kinoform or hologram. It may comprise a computer-generated hologram. A hologram engine or other controller or processor may be provided for outputting signals to control a display device to display the diffractive structure.

There are many technical advancements provided by the method disclosed herein. Firstly, the method does not form ghost images that may be formed by other methods such as point cloud methods. This is because the method inherently ensures that the right image content gets to the right place by fully considering all possible light propagation paths in the waveguide. Secondly, the method can present image content at any depth plane unlike other methods such as point cloud methods which can be poor when the image point distance is very small. This is a significant problem in optical systems utilising an optical combiner having optical power—such as a vehicle windscreen—to form a virtual image. Thirdly, the method inherently accounts for the effects of wavelength such that in a colour projector comprising a plurality of single-colour holographic channels there is no need for image size correction by wavelength such as disclosed in U.S. Pat. No. 10,514,658.

The different propagation paths may pass through the entrance aperture of the viewing system at a different angle. The pupil expander may be arranged so that all hologram channels are routed through the entrance aperture of the viewing system at any viewing position on a viewing plane. The pupil expander only routes each hologram channel via one propagation path to the viewing system for each permitted viewing position. At least two hologram channels of the plurality of hologram channels may be partially overlapping at the entrance aperture of the viewing system.

The first to fourth stages may be ordered stages. The method disclosed operates by projecting back and forth between the sensor plane and the hologram plane, and the method may begin at the sensor plane or the hologram plane. For clarity, the "sensor plane" is the plane at which light of the hologram arrives, in order for the viewer to form/see the image. For example, it may be the plane of the retina of the viewer's eye. The amplitude component of the light field after each propagation to the sensor plane or hologram plane is modified or constrained but the phase component is preserved. In some embodiments, the method starts with the first stage which equates to starting at the hologram plane. However, in other embodiments, the method starts with the third stage which equates to starting at the sensor plane. In these other embodiments, the third stage is followed by the fourth stage. The fourth stage is followed by the first stage and the first stage is followed by the second stage. Each stage may be performed once before hologram extraction or at least some stages may be performed a plurality of times before hologram extraction.

The at least one light propagation path may comprise the plurality of light propagation paths provided by the pupil expander. The structure of the pupil expander facilitates or enables a plurality of different possible light paths therethrough. The different possible light paths may be partially overlapping. In some embodiments, a series of different light paths are created by the pupil expander, wherein each light path in the series is a longer than the last. Each light path of the series exits the pupil expander at a different point on an exit surface thereof to create a corresponding series of light exit points or sub-areas. The series of light exits points or sub-areas may be substantially evenly spaced along the exit face of the pupil expander.

The pupil expander may be a waveguide pupil expander. Each light ray entering the pupil expander may be replicated a plurality of times. The pupil expander may be arranged to propagate light by a series of internal reflections and output light at a plurality of points along a primary face thereof. Each light propagation path may be defined by the number of internal reflections within the waveguide associated with that light propagation path. For example, a first light propagation path may comprise zero internal reflections and therefore corresponds to light that passes directly through the waveguide. For example, a second light propagation path may comprise two internal reflections before exiting the waveguide—namely, a first reflection at a first primary/reflective surface of the waveguide and a second reflection at a second primary/reflective surface of the waveguide, wherein the second primary/reflective surface is opposite or complementary to the first primary/reflective surface. For the avoidance of doubts, the light propagation paths therefore have some overlap. In other examples, a first light propagation path comprise one reflection and the second light propagation path comprises three reflections. The first light propagation path may be the shortest light propagation path and the nth light propagation path may be the longest light propagation path. The different propagation paths may pass through the entrance aperture of the viewing system at a different angle.

The at least one light propagation path may be only one of the plurality of light propagation paths provided by the pupil expander. The first to fourth stages may be carried out for each light propagation path of the plurality of light propagation paths in order to extract a hologram for each light propagation path. The first to fourth stages may be independently carried out for each light propagation path. The plurality of holograms corresponding to the plurality of light propagation paths may be combined in order to form the hologram for display on the display device.

Notably, the method accounts for the plurality of light propagation paths through the waveguide by performing the first to fourth steps (regardless of the starting point) for each light propagation path. The first to fourth steps may be carried out for each propagation path in turn. Alternatively, the first step may be carried out for each propagation path then the second step for each propagation path then the third and so on. It be appreciated that because of the partial overlap of the different propagation paths, the steps performed in relation to the nth propagation path may reuse calculations in relation to the n−1 propagation path, wherein the nth propagation path is next longest propagation path after the n−1 propagation path. The plurality of holograms respectively determined for the plurality of different light propagation path may be combined by addition—particularly if the holograms are phase or phase-only holograms.

The light propagated from the display plane in the first stage may comprise a zeroth complex light field having a phase component that is random, a quadratic function or a sampled quadratic function.

The amplitude component of the zeroth complex light field may be equal to that of the illuminating beam. In some embodiments, the amplitude of the zeroth complex light field is unity. If the method starts with the first stage, the phase component of the zeroth complex light field may be random. The random phase distribution is sometimes referred to as a random phase seed and may be used merely as a starting point for the method when it begins at the hologram plane (i.e. first stage).

The first to fourth stages may be iteratively repeated before the step of extracting the hologram from the final iteration. The light propagated from the display device for the second and subsequent iterations may comprise the phase distribution of the fourth complex light field of the immediately preceding iteration.

If further iterations of the first stage are performed before the method is stopped (i.e. the hologram is acceptable), the phase component from the fourth step is conserved or retained or carried forward. That is, the phase component of complex light field that propagated to the display plane in accordance with the first stage is equal to that of the fourth complex light field.

The hologram may be the phase component of the fourth data set. The hologram may be the phase component of the fourth data set of the final iteration or stage of the method. In some embodiments, the hologram is a kinoform or phase hologram or phase-only hologram. The amplitude component of the fourth complex light field may be discarded.

The hologram may be a hologram of a plurality of images. Each image may have a different respective image distance. The second stage of the method may be independently carried out for each image. Importantly, the method disclosed herein forms a hologram that can form image content on multiple planes at the same time. This is achieved by carrying out the second stage for each different plane and the combining the results—for example, by summing the complex light fields together. Each image may be a real image or a virtual image. Image content may be visible in front of the display device—i.e. downstream of the display device—and/or behind the display device—i.e. upstream of the display device.

Each complex light field is determined by wave propagation optics such as Fresnel propagation, shifted Fresnel propagation, fractional Fresnel propagation, fractional Fourier Transform or scaled Fast Fourier Transform.

Modification of the amplitude component of the second stage may comprise replacing the amplitude component of the second complex light field with that of the image or weighting the amplitude component of the second complex light field based on the amplitude component of the image.

Each step of cropping may comprise cropping the complex light field in accordance with at least one of the size and shape and position of the corresponding pupil. At least one of the size and shape and position of the entrance pupil may be determined by tracking or monitoring the viewing system or receiving information about the viewing system. In embodiments in which the viewing system is an eye, the method may comprise eye tracking or head tracking. The first to fourth stages disclosed herein may be repeated if at least one property of the entrance pupil—such as position or size—changes.

The, or each, image may be a virtual image. The, or each, image may appear to the viewing system to be behind or beyond the display device. That is, the image distance from the viewing system to the perceived image may be greater that the distance from the viewing system to the display device. However, in other embodiments, image content is additionally or alternatively formed downstream of the display device—that is, between the display device and viewing system/s.

The viewing system may be an eye of a viewer. The method may further comprise eye or head tracking the viewer in order to determine at least one of the size and position of the entrance pupil of the viewing system. In some embodiments, the size and/or position of the entrance pupil/s of the viewing system/s is used as part of the method to determine the hologram. In some embodiments, the method is performed in real-time—e.g. video rate—and the hologram is redetermined, such as recalculated, if the viewer moves or e.g. ambient light conditions change affecting the size of the entrance pupil of the viewer.

Propagation along each light propagation path provided by the pupil expander may comprise combining the individual complex light fields of the respective individual light propagation paths. The individual complex light fields may be combined by addition. Each light propagation path of a plurality of different light propagation paths provided by the pupil expander is considered individually. The complex light field formed by each light propagation path is individually determined.

The pupil expander may be a waveguide pupil expander. Each light propagation path corresponds to a different number of internal reflections within the waveguide. In some embodiments, the pupil expander is a waveguide pupil expander having a substantially one-dimensional (i.e. elongate) or two-dimensional shape (e.g. substantially planar such as slab-shaped). In embodiments, the exit pupil is expanded in a long direction or dimension of the component. The pupil expander may comprise a pair of opposing or complementary reflective surfaces. One of these surfaces may be only partially reflective to allow the light to escape at the series of light exit points or sub-areas.

Combining the individual complex light fields may comprise determining a lateral position of each individual complex light field on a plane containing the entrance pupil. The number of internal reflections within the waveguide determines the lateral position.

Combining the individual complex light fields may further comprise determining a total phase shift associated with the internal reflections of each light propagation path. This may comprise summing a plurality of phase shifts associated with each light propagation path, wherein each phase shift results from a reflection within the pupil expander.

There is also disclosed herein a hologram engine arranged to determine a hologram of an image for viewing using a head-up display. The head-up display comprises a display device and a pupil expander. The head-up display is configured to operate with at least one viewing system. Each viewing system comprises an entrance pupil on an entrance pupil plane, lens on a lens plane and a sensor on a sensor plane. The head-up display may be configured to operate with a pair of viewing systems such as a pair of eyes. The display device (e.g. spatial light modulator) is arranged to display the hologram on a hologram plane. The pupil expander is arranged to receive light spatially modulated in accordance with the hologram. For example, the displayed hologram may be illuminated with at least partially coherent light from a source. The display device spatially modulates the received light in accordance with the displayed hologram. The hologram engine is arranged to determine a first complex light field at the entrance pupil of a viewing system. The first complex light field results from the propagation of light from the hologram plane (or, the "display plane") of the display device along each light propagation path of the pupil expander. The first complex light field further results from cropping the complex light field in accordance with the entrance pupil of the viewing system. The hologram engine is further arranged to determine a second complex light field at a sensor plane of a sensor of the viewing system. The second complex light field results from the propagation of light of the first complex light field from the entrance pupil through a lens of the viewing system, to a sensor plane of the sensor of the viewing system. The second complex light field further results from modification of the amplitude component in accordance with the image. The hologram engine is yet further arranged to determine a third complex light field at the entrance pupil. The third complex light field results from the propagation of light of the second complex light field from the sensor plane back through the lens. The third complex light field further results from cropping in accordance with the entrance pupil. The hologram engine is further still arranged to determine a fourth complex light field at the display plane. The fourth complex light field results from the propagation of light of the third complex light field back along each light propagation of the pupil expander. The fourth complex light field further results from cropping in accordance with the display device. The hologram engine is arranged to extract the hologram from a data set corresponding to the fourth complex light field. The hologram engine may be embodied in a display driver such as a field programmable gate array, "FPGA", or application-specific integrated circuit, "ASIC". The display driver may be part of a picture generating unit, "PGU", for a head-up display, "HUD".

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 6b shows a magnified view of the optical paths of FIG. 6a;

FIG. 7 shows the optical system in accordance with embodiments; and

FIG. 8 is a flowchart showing the steps of a method in accordance with embodiments.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
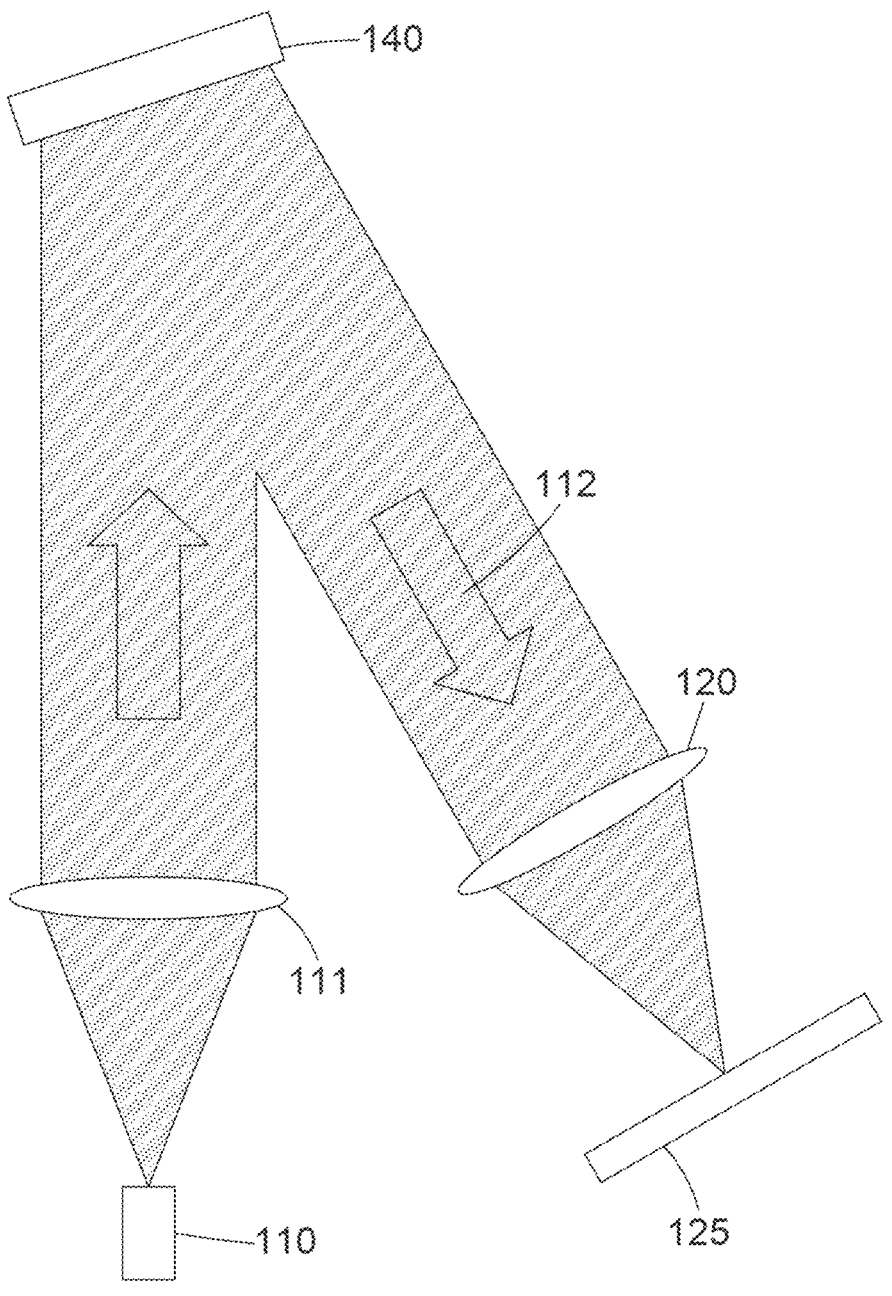
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Example Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information ψ[u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
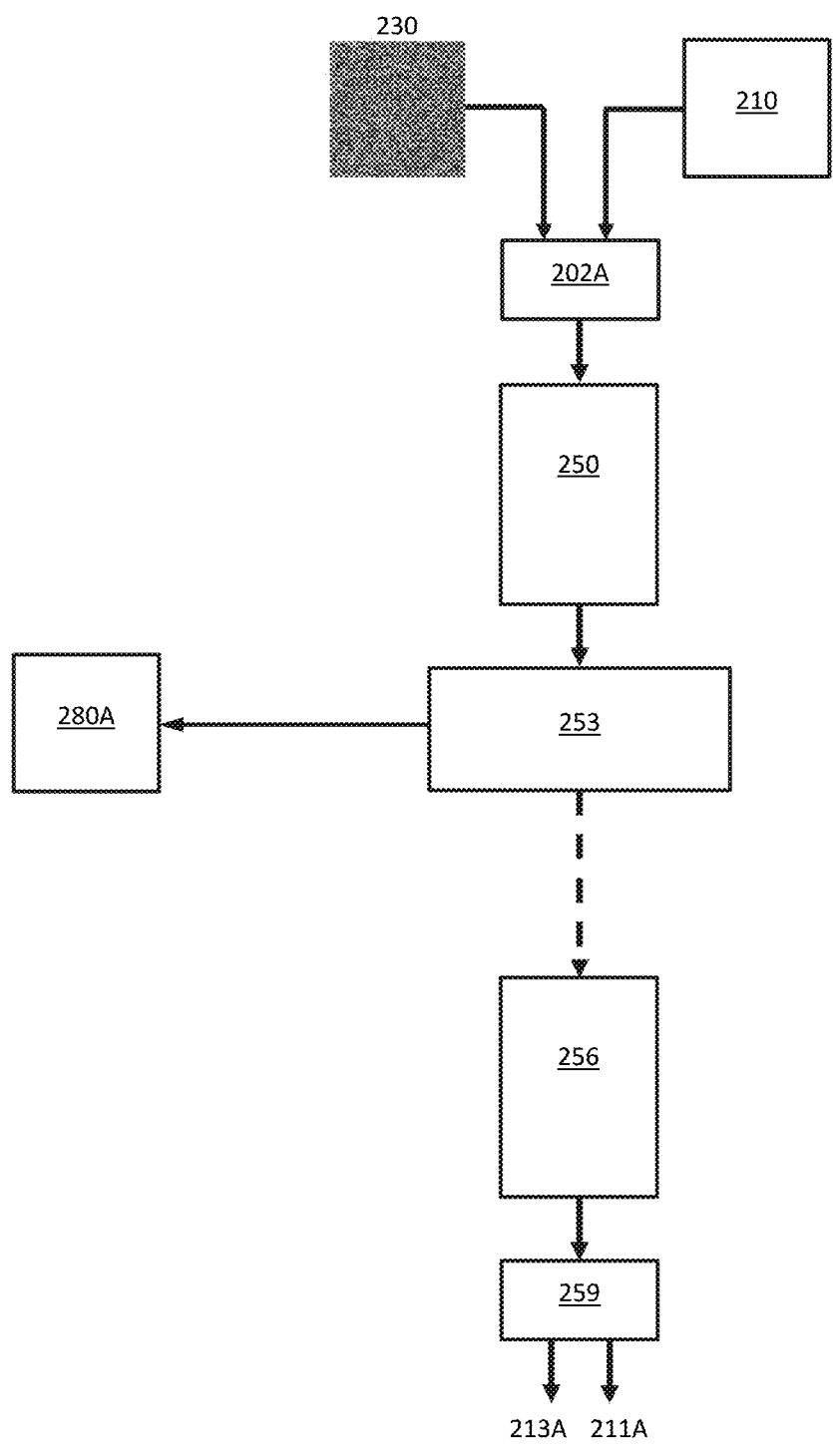
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
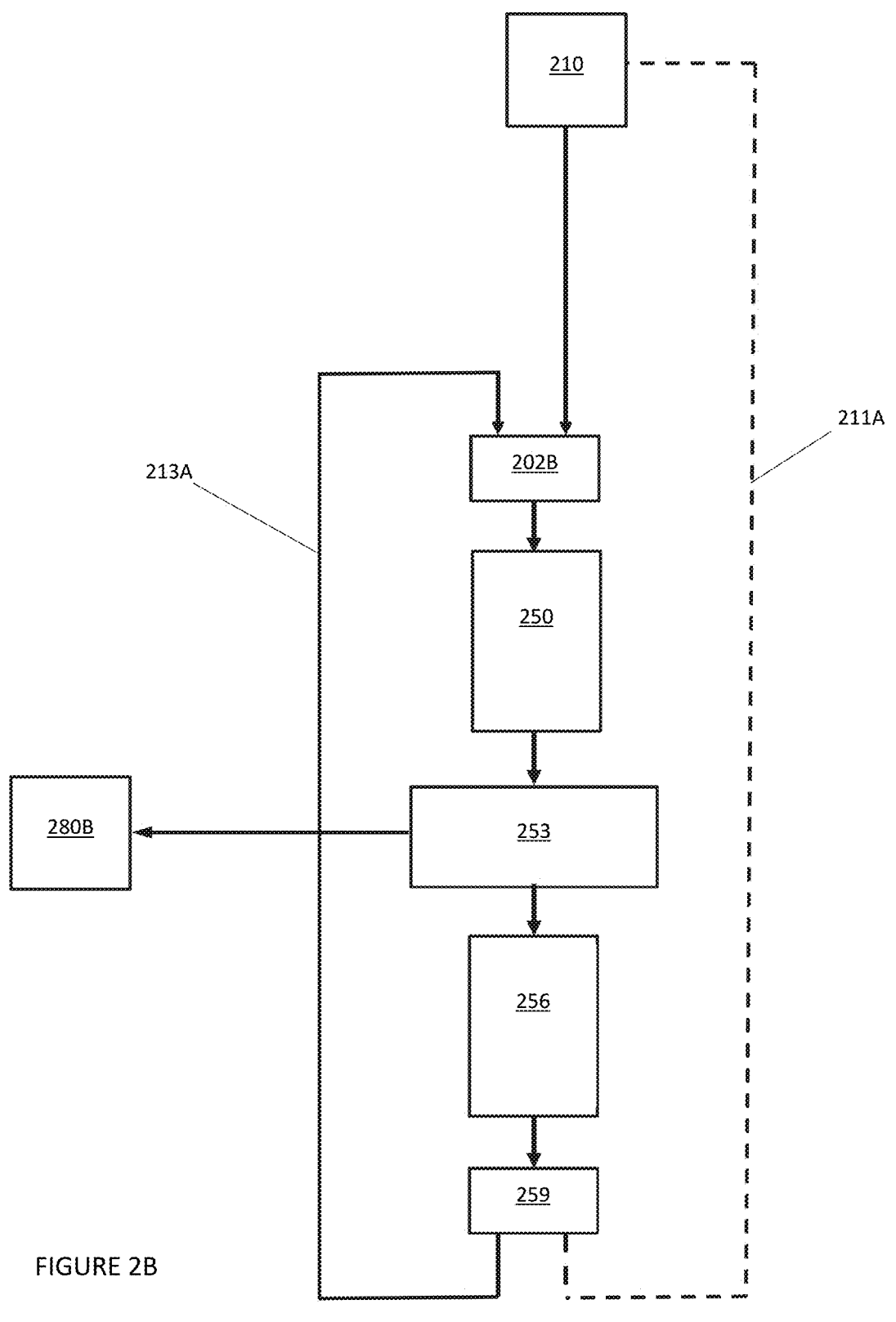
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, iHowen practice, a point is usually reached at which no measurable improvement is observed or the positive benefit of performing a further iteration is out-weighted by the negative effect of additional processing time. Hence, the algorithm is described as iterative and convergent.

Figure 2C:
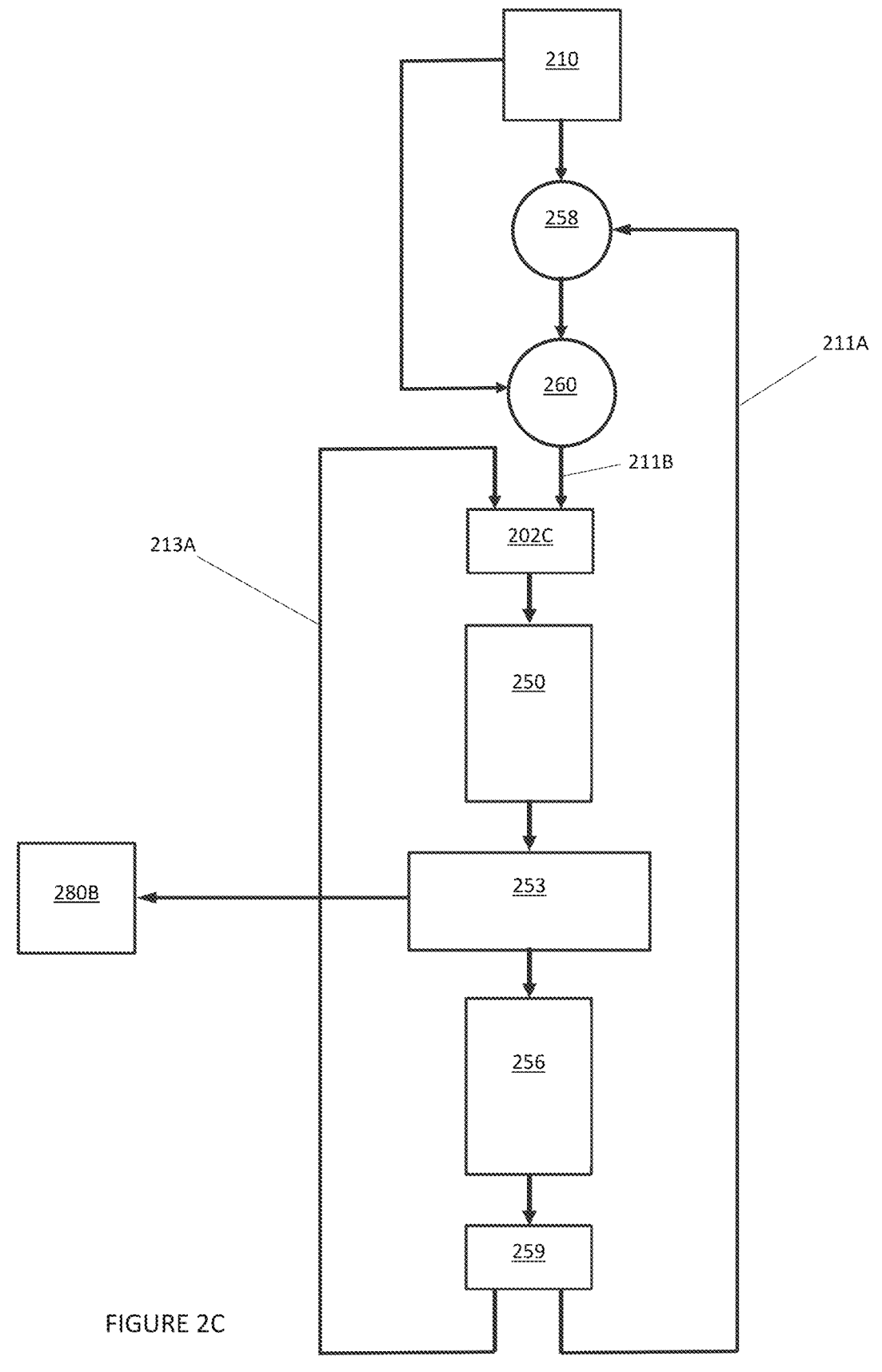
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
$\angle$ is the phase component;
$\psi$ is the phase-only hologram 280B;
$\eta$ is the new distribution of magnitude values 211B; and
$\alpha$ is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram $\psi$(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
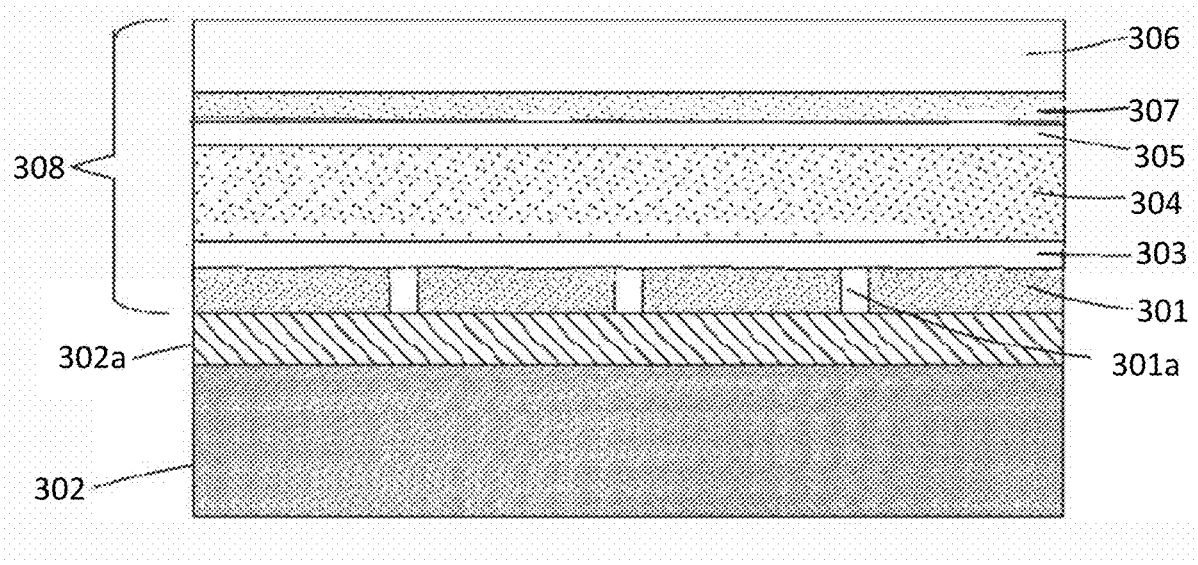
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Image Projection Using a Small Display Device and a Long Viewing Distance

The present disclosure relates to image projection wherein the separation between the display device and viewer is much greater than the size of the display device. The viewing distance (i.e. distance between the viewer and display device) may be at least an order of magnitude greater than the size of the display device. The viewing distance may be at least two orders of magnitude greater than the size of the display device. For example, the pixel area of the display device may be 10 mm×10 mm and the viewing distance may be 1 m. The image projected by the system is formed on a display plane that is spatially separated from the display device. The entrance aperture via which the viewer sees the image may also be relatively small, compared to the viewing distance.

In accordance with the present disclosure, the image is formed by holographic projection. A hologram is displayed on the display device. The hologram is illuminated by a light source (not shown) and an image is perceived on a display plane that is spatially separated from the hologram. The image may be real or virtual. For the purpose of the explanation that follows, it is helpful to consider a virtual image formed upstream of the display device. That is, appearing behind the display device. However, it is not essential that the image is a virtual image and the present disclosure is equally applicable to a real image formed between the display device and viewing system.

The present disclosure enables a very small display device to be used, in order to represent images (real or virtual), even when the viewing distance is relatively large. It does so by providing a hologram that mimics the presence of the image at a desired location and by directing light that has been spatially modulated by that hologram in an intelligent manner, taking into account the location of the viewing system and the size and/or shape of the entrance aperture via which light enters the viewing system.

The display device comprises pixels that display the hologram. The pixel structure of the display device is diffractive. The size of the holographic image is therefore governed by the rules of diffraction. A consequence of the very small nature of the display device is explained below, in broad optical terms, with reference to FIG. 4.

Figure 4:
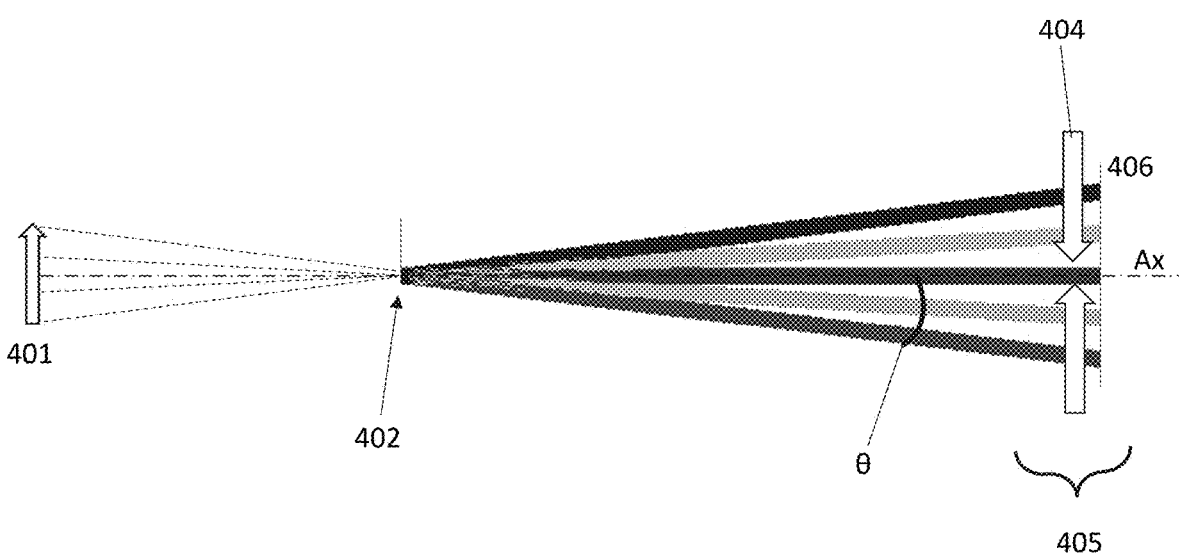
FIG. 4 shows angular content of a virtual image effectively propagating from a display device towards an aperture.

FIG. 4 shows an aperture 402, which forms a small viewing window between a real object or image 401 and a viewing system 405. FIG. 4 illustrates the effect of the aperture 402 on light coming from the real object or real image 401, which is located at a finite distance upstream of the aperture 402. The aperture 402 is very small, relative to the distance between it and a viewing system 405. In this illustrative arrangement, the image 401, display device 402 and viewing system 405 are arranged on an optical axis, Ax.

FIG. 4 shows only those light rays (or, ray bundles) from the image 401 that will pass through the very small viewing window defined by the aperture 402, and travel towards a viewing plane 406, which is defined perpendicular to the optical axis Ax. The skilled reader will appreciate that other light rays will travel from the image 401 but will not coincide with the aperture 402, such that they cannot (in this example) reach the viewing plane 406. Moreover, five light rays (or ray bundles) are shown as travelling from the image 401—one from each of five different parts of the image 401—but, again, the skilled reader will realise that this is illustrative only and the present disclosure is not limited to five rays or ray bundles. aperture 402

The viewing system 405 has an entrance aperture 404, just forward of the viewing plane 406. The viewing system 406 may be a human eye. The entrance aperture 404 may therefore be the pupil of the eye and the viewing plane 406 may be the retina of the eye. Thus, the viewing plane 406 may sometimes be referred to as a "sensor plane".

The light travelling between the aperture 402 and viewing system 405 is real, unmodulated light, in the example of FIG. 4. FIG. 4 illustrates how the very small size of the aperture 402 effectively divides the image content by angle. FIG. 4 shows the five example ray bundles each characterized by a respective angle to the optical axis, Ax, and each travelling from a different respective part of the image 401. The light bundle travelling along the optical axis, Ax, carries the centre part of the image—that is, it is the light of the centre of the image. The other light bundles carry the other parts of the image. A consequence of the very small viewing window defined by the aperture 402, and the very small entrance aperture of the pupil 404, as compared to the large viewing distances that not all image content can pass through the entrance pupil 404 at any given viewing position. In other words, not all image content is received by the eye. In the example of FIG. 4, only one of the five light bundles illustrated passes through the pupil 404 at any viewing position.

In this example, for the pupil 404 position shown, the centre part of the image is seen by the eye. The rest of the image information is blocked. The reader will understand that if the viewer moves up or down, a different light bundle may be received by the eye and, for example, the centre part of the image may be blocked. The viewer therefore only ever sees a portion of the full image. The rest of the image information is blocked. The view of the viewer is, in other words, heavily restricted because they are effectively looking at the image through the small aperture of the display device itself.

In summary, light propagates over a range of angles from the aperture 402 to the small viewing window. At a 1 m viewing distance, only a small range of angles from the small viewing window can propagate through the eye's pupil to form image at the retina for a given eye position. The only parts of the image that are visible are the ones falling within the small angular range shown in FIG. 4 that passes through the entrance aperture 404. Accordingly, the field of view is very small, and the specific angular range depends heavily on the eye position.

The problem of the small field of view and sensitivity to eye position explained with reference to FIG. 4 is a consequence of the large viewing distance and small aperture of the viewing window, as well as the small entrance aperture of the viewing system. The importance of viewing distance is explained further with reference to FIGS. 5 to 7.

It is well known to use holograms, displayed and illuminated on a suitable display device, to form images (real or virtual) at a desired location. However, conventional holographic techniques are not adequate for forming an image clearly and accurately using a small display device, particularly for a relatively large viewing distance or for relatively small viewing apertures. They have further recognised that this is particularly the case if an image, such as a virtual image, is to be represented at a non-infinite distance away from the viewer. However, reliance on the formation of an interim holographic reconstruction generally requires additional optical elements such as a diffuser or a screen which may be impractical or otherwise undesirable particularly in applications where compactness is desired and real estate value is high.

Figure 5A:
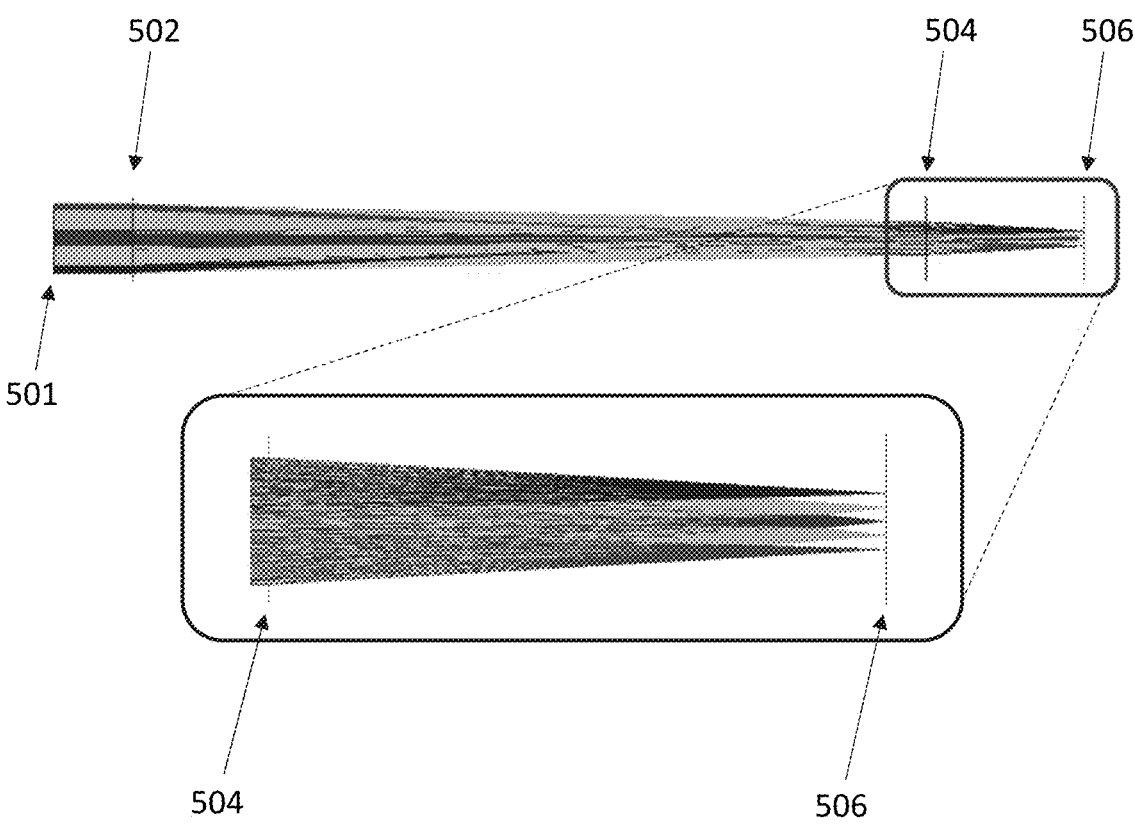
FIG. 5a shows a viewing system with a relatively small propagation distance.

FIG. 5A shows a display device 502 arranged to display a hologram and propagate light that has been spatially modulated in accordance with the hologram to a viewing system comprising an entrance aperture 504 and viewing plane 506. The display device 502 in FIG. 5A is of a similar small physical size to the viewing aperture 402 in FIG. 4. FIG. 5A also shows, upstream of the display device 502, a ray trace of light from a virtual image (not shown) that the hologram represents. The virtual image 501 is at infinity, and so the rays traced between the virtual image and display device 502 are collimated. The collimated light from the virtual image is depicted as comprising five light rays or light ray bundles, however it will be appreciated that this is illustrative only and should not be regarded as limiting on the present disclosure.

The lower part of FIG. 5A shows a magnified view of the viewing system. This figure is schematic and therefore physiological detail of the eye is not shown. In practice, there is, of course, a light source (not shown in FIG. 5A) arranged to illuminate the display device 502.

In FIG. 5A, the distance between the display device and viewing plane is small enough that the full diffraction angle of light rays from the display device 502 can form the image on the retina. In other words, light propagation paths of all five light ray bundles (shown as coming from the virtual image pass through the entrance aperture. Accordingly, all points on the virtual image map onto the retina and all image content is delivered to the viewing plane. Interestingly, different image points on the retina are formed from light propagating from different regions on the display device 502—e.g., the image point closest to the top of FIG. 5A is formed from light propagating from the lower portion of the display device only. Light propagating from other regions of the display device does not contribute to this image point.

Figure 5B:
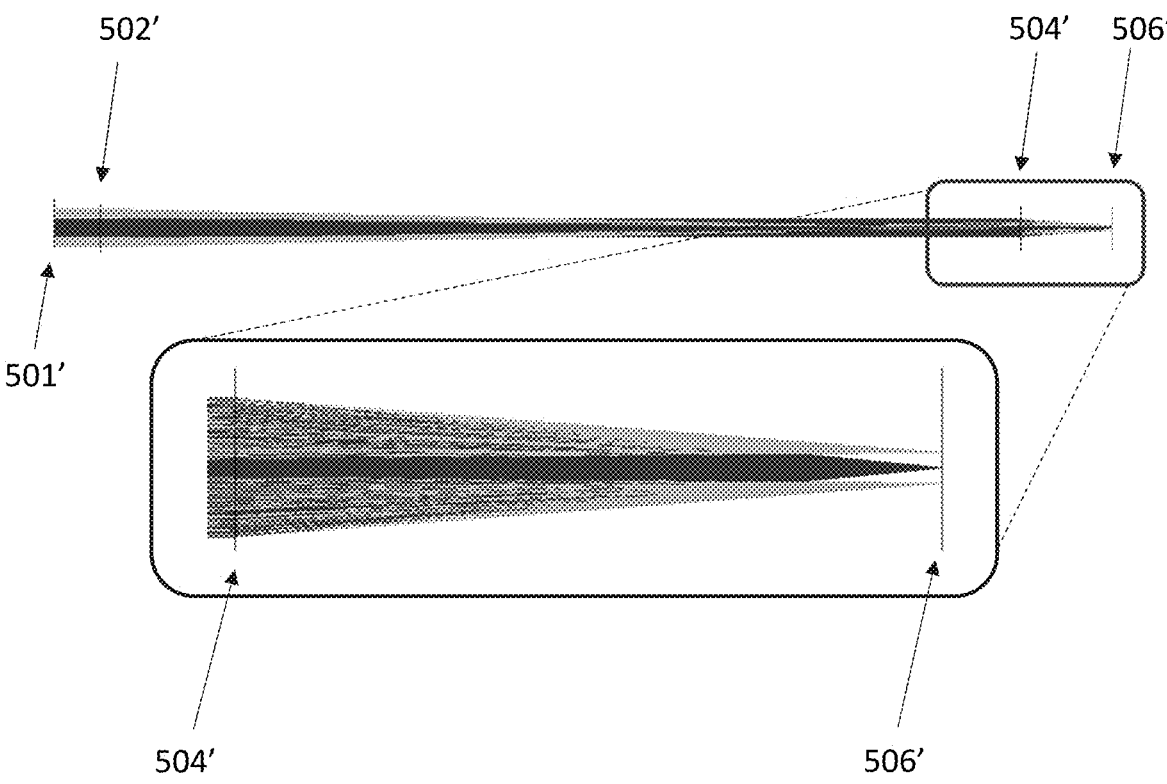
FIG. 5b shows a viewing system with a relatively large propagation distance.

FIG. 5B shows the situation that arises as the viewing distance is increased.

In more detail, FIG. 5B shows a display device 502' arranged to display a hologram and propagate light modulated in accordance with the hologram to a viewing system comprising an entrance aperture 504' and viewing plane 506'. The virtual image 501' is at infinity and so the rays traced between the virtual image and display device are collimated. The lower part of FIG. 5B shows a magnified view of the viewing system. This figure is schematic and therefore physiological detail of the eye is not shown. In practice, there is, of course, a light source (not shown in FIG. 5B) arranged to illuminate the display device 502'.

FIG. 5B only shows those rays of light that can propagate through the aperture 504'; any other rays, which cannot pass through the aperture 504', are omitted. However, it will be understood that those other rays would also propagate from the display device 502'. At the larger viewing distance of FIG. 5B, the light cone has spread out, on the viewing plane, to such an extent that some of the ray bundles are blocked by (i.e., they do not physically coincide with) the entrance aperture 504'. Specifically in this example, ray bundles associated with edge parts of the virtual image are blocked by the entrance pupil 504'. However, if the entrance aperture 504' moved position, parallel to the viewing plane 506', different respective ray bundles may coincide with the aperture 504', such that different respective parts of the virtual image would be seen. Accordingly, for any given aperture position, the entire virtual image is not visible and the part of the virtual image that is visible is heavily dependent on aperture (e.g., eye) position. Thus, large distances between the display device and viewing system are problematic owing to the small size of the display device, particularly when combined with a relatively small entrance aperture.

Figure 6A:
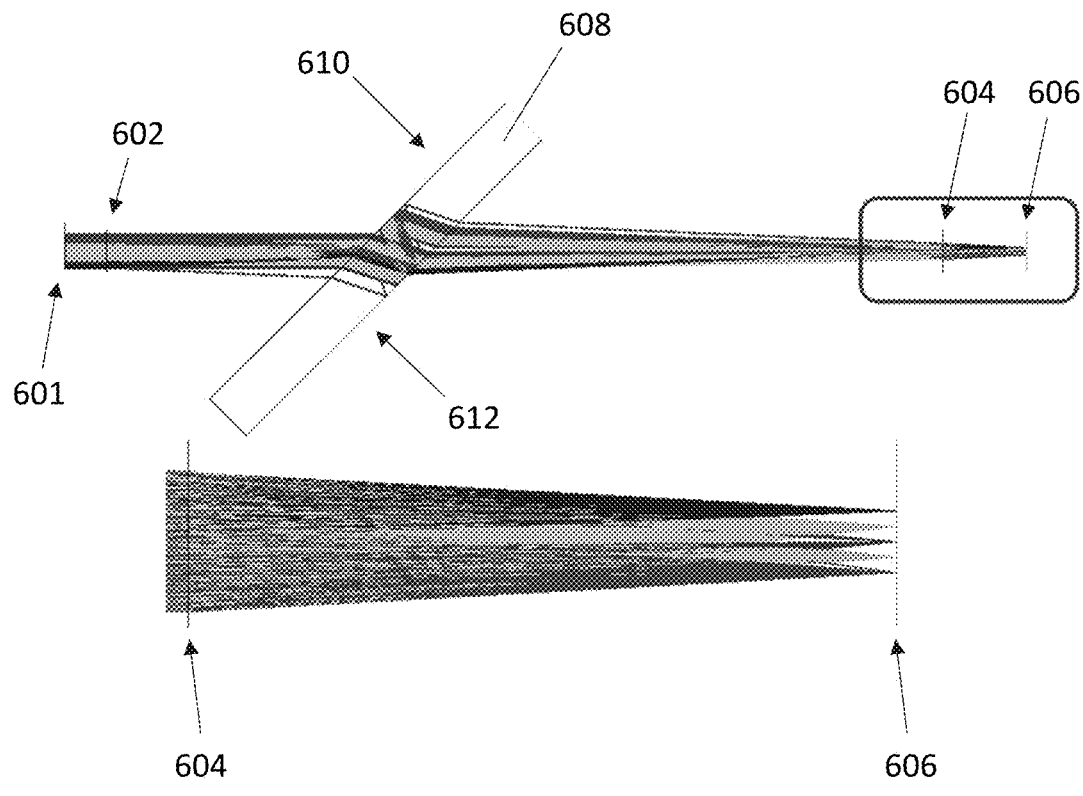
FIG. 6a shows a viewing system with a relatively large propagation distance, which includes a waveguide, for forming a virtual image at infinity.

FIG. 6A shows an improved system comprising a display device 602, propagating light that has been encoded with a hologram displayed on the display device 602, towards a viewing system that comprises an entrance aperture 604 and a viewing plane 606. In practice, there is, of course, a light source (not shown) arranged to illuminate the display device 602. The improved system further comprises a waveguide 608 positioned between the display device 602 and the entrance aperture 604. The lower part of FIG. 6A shows a magnified view of the entrance pupil 604 and the viewing plane 604. This figure is schematic and therefore physiological detail of the eye is not shown.

The viewing distance of FIG. 6 is the same as that of FIG. 5B. However, the ray bundles that were blocked in FIG. 5B are effectively recovered by the waveguide 608 such that the full image information is received by the viewing system—despite the longer viewing distance.

The presence of the waveguide 608 enables all angular content from the display device 602 to be received by the eye, even at this relatively large projection distance. This is because the waveguide 608 acts as a pupil expander, in a manner that is well known and so is described only briefly herein.

In brief, the waveguide 608 comprises a substantially elongate formation. In this example, it comprises an optical slab of refractive material, but other types of waveguide are also well known and may be used. The waveguide 608 is located so as to intersect the light cone that is projected from the display device 602, for example at an oblique angle. The size, location, and position of the waveguide 608 are configured to ensure that light from each of the five ray bundles, within the light cone, enters the waveguide 608. Light from the light cone enters the waveguide 608 via its first planar surface 610 (located nearest the display device 602) and is guided at least partially along the length of the waveguide 608, before being emitted via its second planar surface 612, substantially opposite the first surface 610 (located nearest the eye). As will be well understood, the second planar surface 612 is partially reflective, partially transmissive. In other words, when each ray of light travels, within the waveguide 608, from the first planar surface 610 to the second planar surface 612 of the waveguide 608, some of the light will be transmitted out of the waveguide 608 and some will be reflected by the second planar surface 612, back towards the first planar surface 610. The first planar surface 610 is reflective, such that all light that hits it, from within the waveguide 608, will be reflected back towards the second planar surface 612. Therefore, some of the light may simply be refracted between the two planar surfaces 610, 612 of the waveguide 608 before being transmitted, whilst other light may be reflected, and thus may undergo one or more reflections, (or 'bounces') between the planar surfaces

610, 612 of the waveguide 608, before being transmitted. A net effect of the waveguide 608 is therefore that the transmission of the light is effectively expanded across multiple locations on the second planar surface 612 of the waveguide 608. All angular content output by the display device 602 may thus be present, at a greater number of positions on the display plane (and at a greater number of positions on the aperture plane) than would have been the case, in the absence of the waveguide 608. This means that light from each ray bundle may enter the entrance aperture 604 and contribute to an image formed by the viewing plane 606, despite the relatively large projection distance. In other words, all angular content from the display device 602 can be received by the eye. Therefore, the full diffraction angle of the display device 602 is utilised and the viewing window is maximised for the user. In turn, this means that all the light rays contribute to the perceived virtual image 601.

Figure 6B:
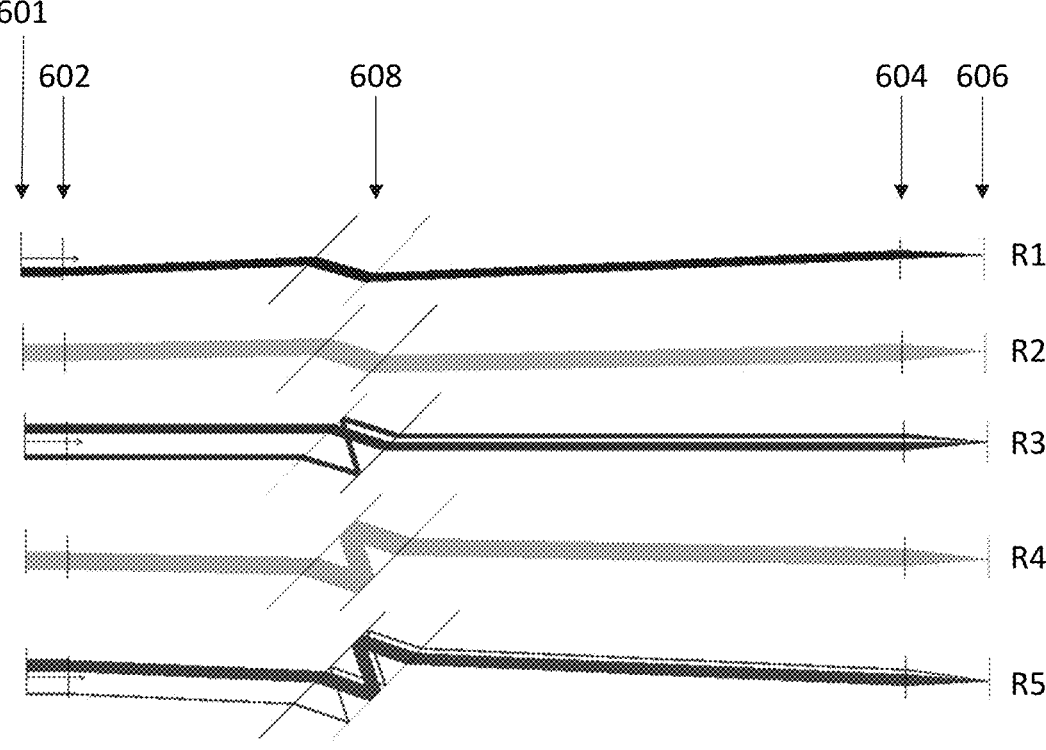

FIG. 6B shows the individual optical paths for each of the five ray bundles that contribute to five respective image points within the virtual image 601 that is formed in FIG. 6A—labelled from top to bottom as R1 to R5, respectively. As can be seen therein, the light of each of R1 and R2 is simply refracted and then transmitted by the waveguide 608. The light of R4, on the other hand, encounters a single bounce before being transmitted. The light of R3 comprises some light from a corresponding first part of the display device 602 that is simply refracted by the waveguide 608 before being transmitted, and some light from a second, different corresponding part of the display device 602 that encounters a single bounce before being transmitted. Similarly, the light of R5 comprises some light from a corresponding first part of the display device 602 that encounters a single bounce before being transmitted and some light from a second, different corresponding part of the display device 602 that encounters two bounces before being transmitted. For each of R3 and R5, two different parts of the LCOS propagate light corresponding to that part of the virtual image.

At least in some applications, it is preferable for the virtual image distance—i.e., for the distance from the viewer to the virtual image—to be finite, as opposed to the virtual image being formed at infinity. In certain applications, there will be a preferred virtual image distance, at which it is desirable or necessary for the virtual image content to appear. For example, this can be the case in a head-up display, for example in an automotive setting, for example if virtual image content is to be superimposed onto real content that is being viewed by the viewer through a vehicle windscreen. For example, a desired virtual image distance may comprise the virtual image content being formed a few metres, for example 3 metres or 5 metres, in front of the viewer's vehicle or windscreen.

Hologram Calculation for Small Display Device, Long Viewing Distance and Pupil Expander The inventors have devised a method of calculating holograms for the optical system shown in FIG. 7. Importantly, the display device is relatively small and the projection distance is relatively long. The hologram is projected directly to the viewing system and the method is capable of implementation in real-time. The relatively small size of the display device and relatively long projection distance necessitate a pupil expander. The method addresses the different paths through the pupil expander. The method allows image content to appear at different distances from the viewing system and/or plural distances, optionally, at the same time—e.g. using one hologram. The method allows image content to appear downstream of the display device and upstream of the display device, optionally, at the same time—e.g. using one hologram.

FIG. 7 shows a spatial light modulator 701 operable to display a hologram of an image. In this embodiment, the spatial light modulator 701 is a liquid crystal on silicon device arranged to module the phase of received light. The spatial light modulator 701 is illuminated by at least partially coherent light from a light source not shown. The light source may be a laser diode. The spatial light modulator 701 outputs light that is spatially modulated in accordance with the display hologram. FIG. 7 shows one light ray 702 of the spatially modulated light. The spatially modulated light is received by a pupil expander 703. The pupil expander 703 is inclined relative to the plane of the display device 701. The pupil expander 703 therefore receives light at non-normal incidence. The incident angle (the angle the optical axis makes with the pupil expander) may be less than 25 degrees such as 10 to 20 degrees. The pupil expander comprises an input surface 703a that receives the spatially modulated light and an output surface 703b. The input surface 703a and output surface 703b are substantially parallel and elongate in a direction of pupil expansion. The input surface 703a comprises at least a portion that is substantially fully reflective (e.g. R=1). The output surface 703b comprises at least a portion that is highly reflective but partially transmissive (e.g. R=0.9 and T=0.1). The reflective surfaces are arranged such that spatially modulated light bounces back and forth therebetween, and light is emitted at a plurality of points along the output surface 703b, as described above with reference to waveguide 608 of FIG. 6. In this embodiment, the pupil expander is substantially elongate. The pupil expander provides pupil expansion in one-direction—namely, the elongate direction—but the present disclosure may be expanded to include the presence of a second pupil expander arranged to expand the pupil in an orthogonal direction.

FIG. 7 shows how light ray 702 has been effectively replicated twice to form three propagation paths 705 each associated with a different respective distance, $Z_0$, $Z_1$ and $Z_2$. The shortest propagation path corresponds to $Z_0$ and, in this example, light that has passed through the waveguide without any internal reflections. The middle-distance propagation path of the three shown corresponds to $Z_1$ and two internal reflections in the pupil expander (one by each surface). The longest propagation path shown corresponds to $Z_2$ and four internal reflections in the pupil expander (two by each surface). The planes $x_0$, $x_1$ and $x_2$ show the spatial extent of the light field associated with each of the three propagation paths, $Z_0$, $Z_1$ and $Z_2$, respectively. More specifically, FIG. 7 shows how the three planes $x_0$, $x_1$ and $x_2$ are offset from each other in the x-direction, as a result of the different respective numbers of bounces that the light has undergone in the pupil expander 703, which in turn determined the location on the output surface 703b, form which each replica was respectively output.

FIG. 7 further shows a viewing system 713 comprising an entrance pupil 707, a lens 709 and a light sensor 711. In embodiments, the viewing system 713 is a human eye and the light sensor 711 is the retina of the eye. FIG. 7 shows how only some of the light field associated with each propagation path passes through the entrance 707. In particular, FIG. 7 shows that each light field is significantly cropped by the aperture (e.g., pupil) 707, and that a different respective part of the (complex holographic) light field is cropped for the three different example light paths shown. FIG. 7 shows the light ray associated with centre of the middle-distance propagation path passing through the centre of the entrance pupil 707. But, for example, the light ray associated with the centre of the light field of shortest propagation path is blocked by a top portion of the aperture 707. However, other light rays associated with the light field of the shortest propagation path can pass through the aperture 707. The light ray associated with the centre of the light field of the longest propagation path is blocked by a lower portion of the aperture 707. However, other light rays associated with the light field of the longest propagation path can pass through the aperture 707 too.

Light passing through aperture 707 is focused by lens 709 onto the light sensor 711. The plane of the light sensor 711 is substantially parallel to the display/hologram plane of the display device 701, and is therefore inclined relative to the elongate dimension of the pupil expander 703 too.

In the arrangement of FIG. 7, the viewer can see the entire image from all positions within the eye-box. However, because the light field of each propagation path is cropped differently to each of the respective others, by the aperture 707, different parts of the image may correspond to a different respective number of bounces. In other words, different parts of the image seen by the viewer may come from different respective light propagation paths FIG. 7 shows three possible light propagation paths by way of example only. The present disclosure is not limited by the number of propagation paths. That is, as the skilled person will appreciate from the following description, the method may be extended to factor-in any number of light propagation paths. Likewise, it is not essential that the pupil expander is inclined relative to the display plane and sensor plane.

The present inventors have devised a method, described below in relation to FIG. 8, which can be used to calculate a suitable hologram to ensure the spatially modulated light reaches the viewer's eye correctly, for a range of different pupil expander set ups and for any possible number of bounces of light within the pupil expander, and therefore for any number of light propagation paths. Importantly, it accounts for the size and shape of the entrance aperture of a viewing system, so that all the required light of an image reaches the viewer.

In summary, the present inventors have identified how to calculate a channelling hologram for an optical set up including a pixelated display device and a pupil expander, for example a head-up display (HUD), using a fast Gerchberg-Saxton-type algorithm. The inventors have recognised a need to take account of all bounces, and all possible optical paths of light, within the pupil expander and have done so by propagating a complex light field from each and summing them together. They have further recognised a need to crop each light field (on each respective light propagation path) in accordance with an aperture (e.g., a viewer's pupil) between the pupil expander and the image plane. They have further recognised that there is a lateral shift of the light field, between each different respective light propagation path) at the aperture and that there are phase shifts on reflection of the light, within the pupil expander. They have adapted the algorithm accordingly, to enable the fast and accurate provision of holograms that are suitable for the respective optical set-up, to allow the viewer o see/perceive an entire image accurately from a range of different positions within an eye-box, even at relatively large viewing distances and even when the display device (such as an SLM) and/or the aperture is relatively small.

FIG. 8 is a flowchart showing the steps of the method. The method resembles a Gerchberg-Saxton type algorithm which uses mathematical transforms back and forth between the image/sensor plane and the hologram/display plane to converge on a phase hologram corresponding to the image, which may be a virtual image, and which may be formed at a finite distance upstream of the spatial light modulator. The amplitude component of the light field after each propagation to the image plane or hologram plane is modified or constrained but the phase component is preserved.

An initial stage of the method comprises steps 802 and 804. The initial stage comprises forming a zeroth complex light field. Step 802 provides a random phase seed forming the phase component of the zeroth complex light field. Step 804 provides the amplitude component of the zeroth complex light field. The amplitude component may be unity or an amplitude distribution representative of the light of a light source that will be used to reconstruction the image from the hologram In step 806, the zeroth complex light field is Fresnel propagated from the spatial light modulator 701 (i.e. from the hologram plane) to the entrance pupil 707 of the viewing system 713 (more specifically, to the plane containing the entrance pupil 707 of the viewing system 713). Again, this embodiment refers to Fresnel propagation as just one example of a number of different mathematical transforms that may be used without departing from the spirit or scope of this disclosure. Step 806 is performed for each number of bounces or internal reflections provided by the pupil expander 703 to form a complex light field in respect of each light propagation path, as shown (by way of example only) at $x_0$, $x_1$ and $x_2$ in FIG. 7. Step 806 includes taking account of the lateral position of the complex light field in the x-direction at the plane of the entrance pupil 707, and of the phase shifts that the light undergoes on each reflection within the pupil expander 703. The different complex light fields may be combined, for example, by addition. The first stage further comprises the step 808 of cropping the combined complex light field in accordance with the size and shape of the entrance pupil 707 to form the first complex light field at the entrance pupil 707.

A second stage of the method comprises steps 810 and 812. In step 810, a second complex light field is determined by propagating the first complex light field from the entrance pupil through the lens 709 and to the plane of the light sensor 711. Step 812 comprises modifying the amplitude component of the complex light field arriving at the light sensor 711. More specifically, step 812 comprises replacing the amplitude component of the complex light field with the amplitude component of the target image or an amplitude component based on that of the target image such as a weighted version of the amplitude component of the target image. The position of the lens 709 used in the propagation determines the image distance—that is, the position of the lens 709 determines where in space the image content will appear. In some embodiments, the image is a virtual image and this distance may be referred to as a virtual image distance, "VID".

Advantageously, the method disclosed herein allows image content to be formed at a plurality of different image distances—e.g. multiple VIDs—using the same hologram. The inventors identified that this may be achieved by repeating the second stage for each image distance by considering different positions of lens 709 in the z-direction. The complex light fields determined in accordance with this approach for each different image distance may be combined by addition, for example.

A third stage of the method comprises step 814 in which the second complex light field is propagated back to the entrance pupil 707 via the lens 709. This may be referred to as a reverse propagation merely to reflect that the light is travelling in the opposite z-direction. In some embodiments, the reverse propagation is a mathematical inverse of the corresponding "forward" propagation. The third stage also comprises cropping the propagated light field in accordance with the size and shape of the entrance pupil 707 to form the third complex light field. The plane of the entrance pupil 707 may be referred to as the "complex hologram plane", as indicated in FIG. 8.

A fourth stage comprises steps 816 and 818. In step 816, the light is propagated back from the plane of the entrance pupil 707 to the plane of the spatial light modulator 702 via each of the plurality of light propagations paths of the pupil expander, in the matter described above in relation to the first stage—but in the opposite light direction, of course (i.e. a "reverse" propagation). Step 818 comprises cropping the propagated light field in accordance with the size and position of the active/pixel area of the display device, to output a fourth complex light field. The number of complex values of each complex light field may be equal or less than the number of pixels of the display device.

Step 820 comprises extracting the hologram (or, "kinoform") from a data set corresponding to the fourth complex light field (which may be referred to as a "fourth data set"). The hologram may comprise the phase values of the fourth complex light field in which case the hologram may be referred to as a kinoform. As explained earlier in this disclosure, the method may equally start at the image plane (i.e. the third stage). At least one iteration of each stage is required in accordance with this disclosure. FIGS. 9 and 10 describe the hologram formed by this method.

Light Channelling

A hologram (or, "kinoform", or "diffractive structure") that is calculated according to the present disclosure has unique properties, which are not observable or achievable using conventional methods of hologram calculation.

In summary, a hologram that is calculated in accordance with the present disclosure enables a display device, for example such as but not limited to an LCOS, on which it is displayed and illuminated, to output channels of spatially modulated light, wherein each channel corresponds to a different respective portion of the corresponding image. This unique channelling enables the display device to work in conjunction with a suitable pupil expander such as a waveguide, in order to allow a viewer to accurately see the whole image via the relatively small aperture of their eye, even when the viewing distance is relatively large and when the display device is relatively small, and without being required to move their eye. For example, a virtual image located at a finite distance upstream of the display device may be viewed (correctly, and in its entirety) at a relatively large distance, even though both the aperture of the viewer's eye and the display device on which the hologram is displayed are relatively very small. This has not previously been achievable, either using conventional holography or using non-holographic techniques.

In accordance with an aspect of this disclosure, the inventors found that, when the hologram is calculated using Fresnel propagation, such as via the method shown in FIG. 8 above, spatially modulated (I.e., "holographic") light corresponding to different respective portions of the image follow different respective optical paths. Thus, the inventors recognised that the hologram may be employed to direct each of those optical paths to the viewer's eye simultaneously, thereby enabling the viewer to receive all the holographic light that is needed for their eye/brain to reconstruct the entirety of the image, without moving their eye(s) or making any other physical changes. As shown in the detailed examples above, a waveguide or other pupil expander may be used in conjunction with a display device, displaying the calculated hologram(s), in order to achieve this.

Figure 9A:
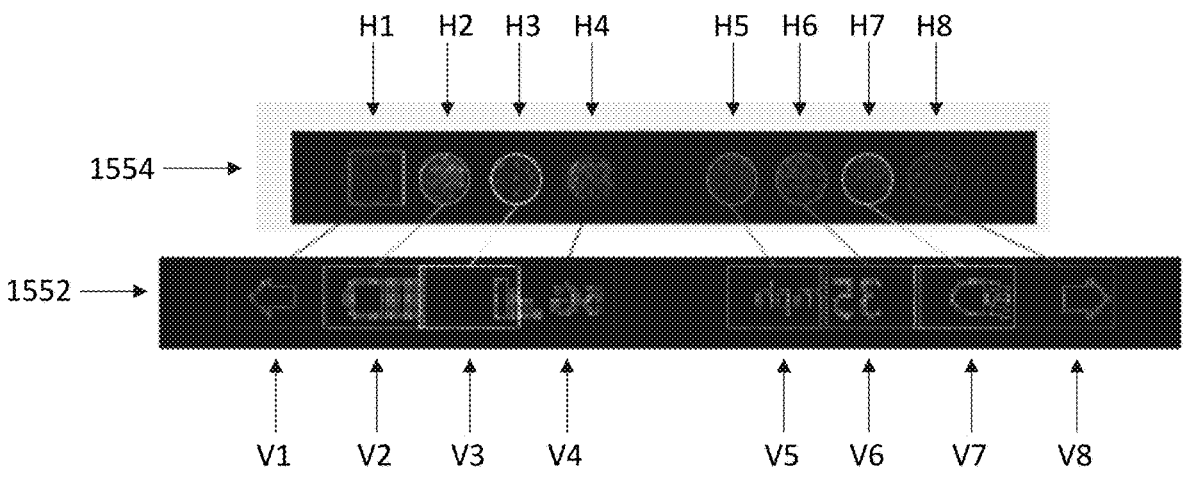
FIG. 9A shows an image comprising a plurality of image areas (bottom) and corresponding hologram comprising a plurality of hologram components (top)
Figure 9B:
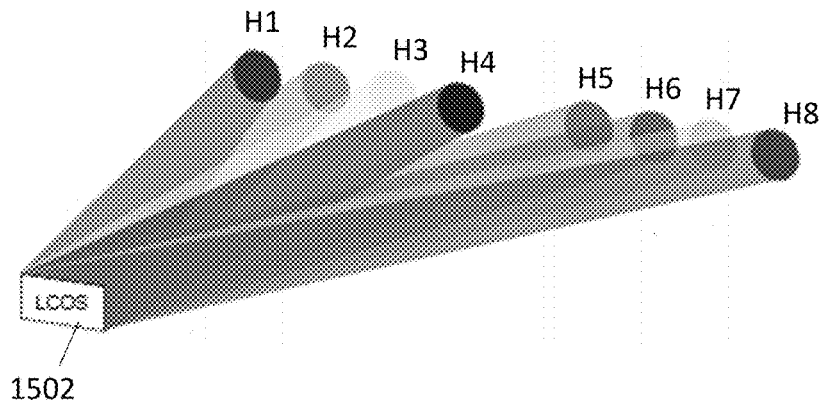
FIG. 9B shows a hologram, in accordance with the present disclosure, characterised by the routing or channelling of holographically encoded light into a plurality of discrete hologram channels.
Figure 10:
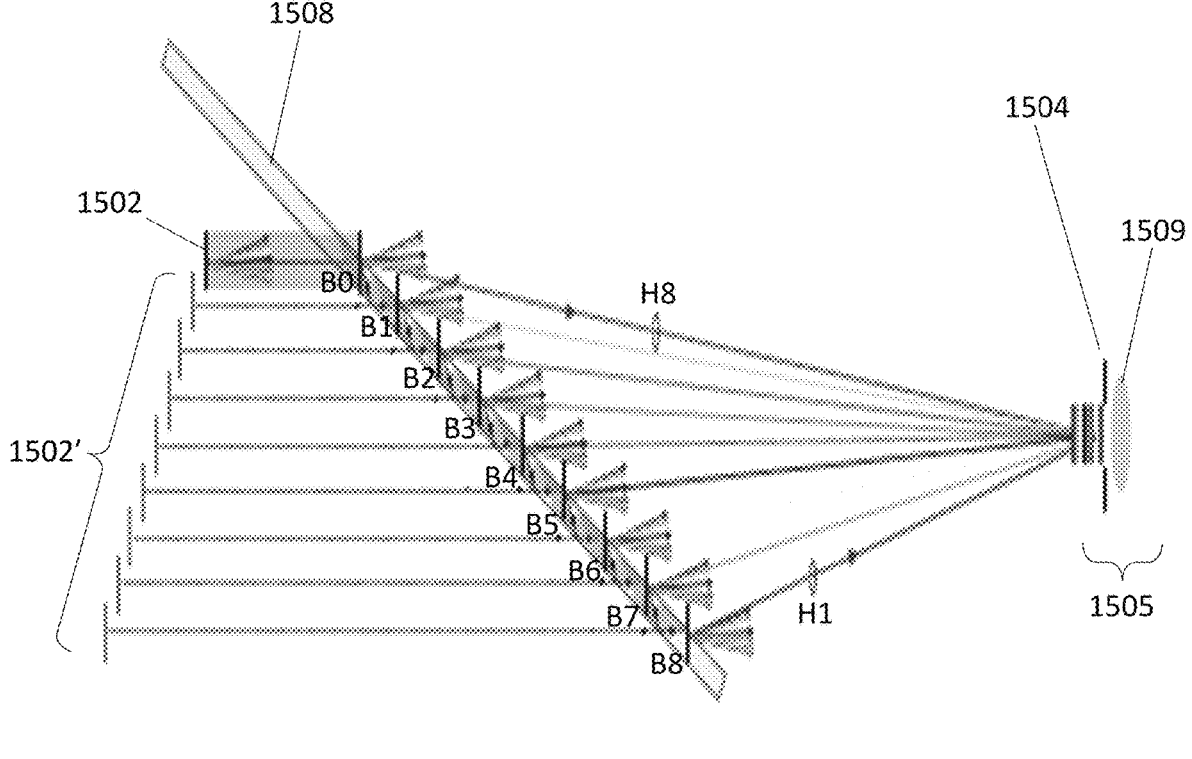
FIG. 10 shows an optimised system arranged to route the light content of each hologram channel through a different optical path to the eye.

In an embodiment illustrated by FIGS. 9A and 9B, the inventors configured an optical system to display a virtual image that comprises a plurality of discrete virtual image components or areas, to aid with understanding of the unique properties of holograms as disclosed herein. However, the present disclosure is equally applicable to the calculation and display of holograms corresponding to images that have continuous (i.e., non-discrete) image content, and/or to holograms of images having any number/size/division of discrete image portions. In FIGS. 9A and 9B, in simple terms, (i) the virtual image comprises a plurality of discrete virtual image components or areas and (ii) light of each virtual image component is associated with a different number of bounces/reflections within the waveguide. However, in some other embodiments, it is possible that light of two or more discrete virtual image components would undergo the same number of bounces within the waveguide.

FIG. 9A shows an image 1552 for projection comprising eight discrete image areas/components, V1 to V8. FIG. 9A shows eight image components by way of example only and the image 1552 may be divided into any number of components. FIG. 9A also shows the encoded light pattern (I.e., the pattern of holographic light) 1554 that is formed when the hologram (calculated as disclosed herein) is suitably displayed and illuminated. The encoded light pattern 1554 can reconstruct the image 1552—e.g. when transformed by the lens of a suitable viewing system, such as the viewer's eye(s). The encoded light pattern 1554 comprises first to eighth components or channels, H1 to H8, corresponding to the first to eighth image components/areas, V1 to V8. The hologram may therefore be characterised by the channelling of holographic light that it performs. This channelling of light only occurs due to the specific method(s) of determining the hologram disclosed herein, and is illustrated in FIG. 9B. Specifically, the hologram in accordance with this disclosure directs the holographic light into a plurality of discrete channels, which may be formed on a plane as discrete respective areas. The discrete areas are discs in the example shown but other shapes are envisaged. As detailed above, the hologram is calculated (e.g., cropped) specifically with the size/shape of the light field at the display device and/or the size/shape of the light field at the viewing aperture(s) in mind. Therefore, the size and shape of the optimum disc may be related to the size and shape of the entrance pupil of the viewing system.

The channels of holographic light that are output by the hologram effectively decompose the image content (of the image that is to be holographically reconstructed by the viewer) by angle. This can be understood further by comparison to the optical arrangement of FIG. 4 hereabove, in which light ray bundles from a plurality of discrete locations on a real image 401 travel to the aperture (or, viewing window) 402 at a plurality of discrete corresponding angles, but light from only one of those bundles can travel through the viewer's eye, at any given eye position. A hologram that is calculated as described herein, and displayed by a suitable display device, can form a holographically reconstructed virtual image, to mimic the presence of that image 401 (or, indeed, of any desired image/object) at a desired image distance. However, in a notable advantage over the optical system of FIG. 4, and over conventional holographic systems, the hologram calculated as described here in enables the entire image to be seen or perceived by the viewer even when the display device is relatively small and when an entrance aperture of the viewing system, such as the viewer's eye, is relatively small, and when the viewing distance is relatively large. In other words, and by way of non-limiting example, the hologram would enable all the five light ray bundles depicted in FIG. 4 to reach the viewer simultaneously, thus completely forming the desired virtual image.

Importantly, such a hologram, when suitably displayed and illuminated, causes the display device to output channels of holographic light, wherein each channel of holographic light corresponds to an angle (or, in some cases, a bundle of angles) at which light from a respective part of the desired image/object would arrive at the display device. Thus, it can be said that the channels of holographic light correspond to different respective angular portions of image content. This is not the case for conventional holograms. Moreover, unlike unmodulated light from a real image/object, or spatially modulated light formed from a conventional hologram, the channels of holographic light disclosed herein are specifically configured so that they can be guided, by a suitable waveguide or other pupil expander, located between the display device and the viewer, to ensure that each of the channels—and, so, holographic light corresponding to each (i.e., every) part of the image—may be received simultaneously by the viewer. Moreover, each channel may be received only once, at least in some embodiments.

FIG. 10 shows an improved viewing system 1500, in accordance with the recognitions illustrated in FIGS. 9A and 9B. The method of FIG. 8 may be applied to calculate the hologram in the scheme illustrated in FIGS. 9A to 10. Notably, the method of FIG. 8 may be carried out for each channel of holographic light that the hologram will be configured to output, wherein each channel corresponds to a different respective part of an image to be seen/perceived by the viewer, and wherein each channel of light will travel to the viewer via a different respective transmission point on an output face of the pupil expander. The method of claim 8 may be carried out in order to output a hologram for each channel, and the individual channel-specific holograms may be combined to form a final, complete hologram that will lead to the holographic reconstruction of the target image, when that hologram is suitable displayed and illuminated by the optical system for which it has been calculated.

The viewing system 1500 comprises a display device, which in this arrangement comprises an LCOS 1502. The LCOS 1502 is arranged to display a modulation pattern (or 'diffractive pattern') comprising the hologram and to project light that has been holographically encoded towards an eye 1505 that comprises a pupil that acts as an aperture 1504, a lens 1509, and a retina (not shown) that acts as a viewing plane. There is a light source (not shown) arranged to illuminate the LCOS 1502. The light source may for example comprise a laser diode. The hologram is configured such that the entire hologram can be illuminated by a single light ray (or, a single bundle of light rays). There is no requirement for multiple light sources or, for example, for a plurality of light rays of different respective wavelengths to illuminate the hologram, in order for it to function as described herein.

The lens 1509 of the eye 1505 performs a hologram to image transformation. There is therefore no holographic reconstruction of the image between the LCOS and the eye 1505.

The viewing system 1500 further comprises a waveguide 1508 positioned between the LCOS 1502 and the eye 1505. The projection distance in FIG. 10 may be relatively large.

However, as described in relation to previous Figures, the presence of the waveguide 1508 enables all angular content from the LCOS 1502 to be received by the eye 1505, even at this relatively large projection distance. This is because the waveguide 1508 acts as a pupil expander, in a manner that has been described hereabove.

Additionally, in this arrangement, when the LCOS 1502 has been encoded in accordance with the methods described herein, the waveguide 1508 can be oriented at an angle with respect to the LCOS 1502 in order to establish a unique relationship, between the light from the LCOS 1502 and the virtual image that the viewer will perceive. The size, location, and position of the waveguide 1508 are configured to ensure that light from each holographic channel—and, so, light from each part of the virtual image enters the waveguide 1508 and is guided along its elongate axis, bouncing between the substantially planar surfaces of the waveguide 1508. Each time the light reaches the second planar surface (nearest the eye 1505), some light is transmitted and some light is reflected.

FIG. 10 shows a total of nine "bounce" points, B0 to B8, along the length of the waveguide 1502. The reader will notice that the centre of the image 1552 kept blank. FIG. 10 shows zeroth to ninth light "bounce" or reflection points, B0 to B8, within the waveguide. Although light relating to all points of the image (V1-V8)—i.e., light of each of the eight holographic light channels, H1 to H8—is transmitted out of the waveguide at each "bounce" from the second planar surface of the waveguide 1508, only the light from one of angular part of the image (e.g. light of one of V1 to V8) has a trajectory that enables it to reach the eye 1505, from each respective "bounce" point, B0 to B8. Moreover, light from a different channel—and, therefore, light from a different respective angular part of the image, V1 to V8, reaches the eye 1505 from each respective "bounce" point, in this embodiment. FIG. 10 shows light of all the different holographic light channels being emitted at each "bounce" point, (depicted by a plurality of short arrows at each transmission point), but then only shows the optical path, to the eye 1505, of the respective channel—which corresponds to at unique respective image portion (i.e., unique respective angular image content) that will actually reach the eye 1505 from that bouncepoint. The channel whose optical path is shown as reaching the eye for each bouncepoint is the channel that will contribute to a respective portion of the virtual image from that respective part of the waveguide. For example, for the zeroth bounce, B0, the light that is transmitted by the waveguide 1508 is simply refracted and does not undergo any reflections therein. Light of the eighth sub-holographic subchannel, H8, reaches the eye from the zeroth bounce, B0. For the next bounce B1, the light that is transmitted by the waveguide 1502 undergoes one bounce therein, before transmission. Light from the seventh hologram, H7, reaches the eye from the next bounce, B1 This continues in sequence until the light that is transmitted by the waveguide 1508 at the final bounce, B8, has undergone eight bounces, before being transmitted and reaching the eye 1505, and comprises light encoded in accordance with the first hologram, H1. In this arrangement, light from each channel will reach the viewer substantially simultaneously, within the integration time of the eye—one each from a plurality of different respective bouncepoints on the waveguide. Thus, the viewer will receive holographic light corresponding to the entire virtual image at the same time, without moving their eye or making any other changes, even though their eye and the display device are both relatively very small and the viewing distance is relatively large.

In the example shown in FIGS. 10, light of only one image area reaches the eye from each bounce point. A spatial correlation between areas of the virtual image and their associated bounce point on the waveguide is therefore established—when the hologram is determined as described herein. In some other examples, there may be relatively small overlaps such that one region of the image comes from two adjacent transmission points, and thus is comprised within two adjacent discs of light that propagate from the waveguide, towards the viewing plane.

Thus, the recognitions made by the inventors, and the methods and arrangements described herein, can enable a diffractive pattern (or, light modulation pattern) comprising a hologram to be generated that, when displayed on an LCOS or other suitable display device, can enable the spatially modulated, or holographic, light to be emitted therefrom effectively in a plurality of 'discs', or channels of holographic light, each of which corresponds to (more specifically, encodes) a different respective part of the corresponding virtual image.

Thus, improved methods and arrangements are described herein that enable holograms to be calculated, and to be displayed on a suitable display device, in a manner that enables clear images to be seen, by a viewer, when the display device is illuminated by a suitable light source. For example, they can enable a viewer to see an image, such as a virtual image, at a finite distance from the display device (rather than at infinity) even though the display device and the viewer's viewing aperture(s) (I.e., eye(s)) are relatively very small and the viewing distance is relatively large.

The improved methods and arrangements described herein can be carried out in real-time and may be repeated, for example on a very rapid basis, to accommodate change in viewing aperture location/position. They may be implemented for more than one viewing aperture such as for two eyes. They may be repeated, for example on a very rapid basis, to enable the display of a plurality of different holograms, and thus the viewing of a plurality of different corresponding images, in succession and/or in a sequence, series, pattern or loop.

The improved methods and arrangements described herein can be implemented in a variety of different applications and viewing systems. For example, they may be implemented in a head-up-display (HUD). In an improvement over many conventional HUDs, in which virtual images are formed at infinity, the improved methods and arrangements described herein can be implemented for creating virtual images at finite image distances—which can be selected and tuned by a suitable controller—whilst still eliminating ghost images.

Although virtual images, which require the eye to transform received modulated light in order to form a perceived image, have generally been discussed herein, the improved methods and arrangements described herein can be applied to real images.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. The holographic projection system of the present disclosure may be used to provide an improved head-up display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A method of determining a hologram of a target image for a system comprising a display device arranged to display the hologram at a hologram plane and a viewing system that comprises an entrance pupil, a lens, and a sensor, wherein the viewing system is arranged to view the hologram through a pupil expander that provides a plurality of light propagation paths from the display device to viewing system, the method comprising:

a first stage, for a first light propagation path, comprising determining a first complex light field at the entrance pupil of the viewing system, wherein the first complex light field results from propagation of light from the hologram plane of the display device, along the first light propagation path, to the entrance pupil, and cropping the light field of the first light propagation path in accordance with at least one of a size, a shape, or a position of the entrance pupil to form the first complex light field;

a second stage comprising determining a second complex light field at a sensor plane of the sensor of the viewing system, wherein the second complex light field results from propagation of light of the first complex light field from the entrance pupil to the sensor, via the lens of the viewing system, and replacing an amplitude component of the complex light field that arrives at the sensor plane with an amplitude component that is based on the amplitude component of the target image;

a third stage comprising determining a third complex light field at the entrance pupil, wherein the third complex light field results from reverse propagation of light of the second complex light field from the sensor plane back through the lens and cropping in accordance with the entrance pupil;

a fourth stage comprising determining a fourth complex light field at the display plane, wherein the fourth complex light field results from reverse propagation of light of the third complex light field back along the first light propagation path and cropping the propagated light, at the hologram plane, in accordance with at least one of the size or position of a pixel area of the display device; and a fifth stage comprising extracting a hologram from a data set corresponding to the fourth complex light field.

2. The method of claim 1, comprising repeating the first to fourth stages for one or more additional light propagation paths of the plurality of light propagation paths provided by the pupil expander.

3. The method of claim 2, wherein the first to fourth stages are carried out for each light propagation path of the plurality of light propagation paths in order to extract a hologram for each light propagation path, wherein a plurality of holograms corresponding to the plurality of respective light propagation paths are combined in order to form the hologram for display on the display device.

4. The method of claim 1, wherein the light propagated from the hologram plane in the first stage comprises a zeroth complex light field comprising a random phase distribution.

5. The method of claim 1, wherein the first to fourth stages are iteratively repeated before the fifth stage of extracting the hologram from a final iteration, and wherein the light propagated from the hologram plane of the display device for a second and subsequent iterations comprises a phase distribution of the fourth complex light field of an immediately preceding iteration.

6. The method of claim 1, wherein the hologram is extracted from a phase component of a fourth data set corresponding to the fourth complex light field.

7. The method of claim 1, wherein the hologram is a hologram of a plurality of images, wherein each image has a different respective image distance, and the second stage of the method is independently carried out for each image.

8. The method of claim 1, wherein each complex light field is determined by wave propagation optics comprising Fresnel propagation.

9. The method of claim 1, wherein replacing the amplitude component of the complex light field that arrives at the sensor plane with an amplitude component that is based on the amplitude component of the target image comprises replacing the amplitude component of the second complex light field with that of the target image or weighting the amplitude component of the second complex light field based on the amplitude component of the target image.

10. The method of claim 1, wherein each step of cropping comprises cropping in accordance with at least one of size and position.

11. The method of claim 1, wherein an individual image comprises a virtual image.

12. The method of claim 1, wherein the viewing system comprises an eye of a viewer and wherein the method further comprises eye or head tracking the viewer in order to determine at least one of a size and position of the entrance pupil of the viewing system.

13. The method of claim 1, wherein propagation along the first light propagation path of the pupil expander comprises propagation along multiple light propagation paths of the plurality of light propagation paths of the pupil expander and combining respective individual complex light fields resulting from those multiple different light propagation paths of the pupil expander, or wherein the individual complex light fields are combined by addition.

14. The method of claim 13, wherein the pupil expander is a waveguide pupil expander and each light propagation path corresponds to a different number of internal reflections within the waveguide.

15. The method of claim 14, wherein combining the respective individual complex light fields comprises determining a lateral position of each respective individual complex light field on a plane of the entrance pupil.

16. The method of claim 14, wherein combining the respective individual complex light fields further comprises determining a total phase shift associated with the internal reflections of each light propagation path.

17. A hologram engine arranged to determine a hologram of a target image for viewing using a head-up display, wherein the head-up display comprises:

a display device arranged to display the hologram at a hologram plane; and a pupil expander arranged to receive light spatially modulated in accordance with the hologram, wherein the hologram engine is arranged to:

determine a first complex light field at an entrance pupil of a viewing system, wherein a plurality of light propagation paths of the pupil expander are defined between the hologram plane of the display device and the entrance pupil, wherein the first complex light field results from propagation of light along a first light propagation path, and cropping the light field of the first light propagation path in accordance with at least one of a size, a shape, or a position of the entrance pupil, to form the first complex light field;

determine a second complex light field at a sensor plane of a sensor of the viewing system, wherein the second complex light field results from the propagation of light of the first complex light field from an entrance aperture through a lens of the viewing system and replacing an amplitude component of the complex light field that arrives at the sensor plane with an amplitude component that is based on the amplitude component of the target image;

determine a third complex light field at the entrance pupil, wherein the third complex light field results from reverse propagation of light of the second complex light field from the sensor plane back through the lens and cropping in accordance with the entrance pupil;

determine a fourth complex light field at the hologram plane, wherein the fourth complex light field results from reverse propagation of light of the third complex light field back along the first light propagation path and cropping the propagated light, in accordance with at least one of the size or the position of a pixel area of the display device; and extract the hologram from a data set corresponding to the fourth complex light field.

18. A system comprising:

a display device configured to display a hologram at a hologram plane;

a viewing system that comprises an entrance pupil, a lens, and a sensor, wherein the viewing system is configured to view the hologram through a pupil expander configured to provide a plurality of light propagation paths from the display device to viewing system;

one or more processors; and tangible, non-transitory computer-readable media comprising program instructions executable by the one or more processors such that the system is configured to determine the hologram of a target image according to a method comprising:

determining, for a first light propagation path, a first complex light field at the entrance pupil of the viewing system, wherein the first complex light field results from propagation of light from the hologram plane of the display device along the first light propagation path to the entrance pupil, and cropping the light field of the first light propagation path in accordance with at least one of a size, a shape, or a position of the entrance pupil of the viewing system, to form the first complex light field;

determining a second complex light field at a sensor plane of the sensor of the viewing system, wherein the second complex light field results from propagation of light of the first complex light field from the entrance pupil to the sensor, via the lens of the viewing system, and replacing an amplitude component of the complex light field that arrives at the sensor plane with an amplitude component that is based on the amplitude component of the target image;

determining a third complex light field at the entrance pupil, wherein the third complex light field results from reverse propagation of light of the second complex light field from the sensor plane back through the lens and cropping in accordance with the entrance pupil;

determining a fourth complex light field at the display plane, wherein the fourth complex light field results from reverse propagation of light of the third complex light field back along the first light propagation path and cropping the propagated light in accordance with at least one of the size or position of a pixel area of the display device; and extracting a hologram from a data set corresponding to the fourth complex light field.

19. The system of claim 18, wherein the plurality of light propagation paths provided by the pupil expander comprise the first light propagation path.

20. The system of claim 18, wherein the first light propagation path is one of the plurality of light propagation paths provided by the pupil expander, and wherein each of determining the first complex light field, determining the second complex light field, determining the third complex light field, and determining the fourth complex light field is carried out for each light propagation path of the plurality of light propagation paths to extract a hologram for each light propagation path, wherein a plurality of holograms corresponding to the plurality of light propagation paths are combined in order to form the hologram for display on the display device.

* * * * *